US010140630B2

(12) United States Patent
Strompolos et al.

(10) Patent No.: US 10,140,630 B2
(45) Date of Patent: Nov. 27, 2018

(54) FACILITATING USER-GENERATED CONTENT

(71) Applicant: Fullscreen, Inc., Culver City, CA (US)

(72) Inventors: George Strompolos, Venice, CA (US); Aaron Harpole, Santa Monica, CA (US); Jason Stakelon, Marina Del Rey, CA (US); Andrew Baumann, Santa Monica, CA (US)

(73) Assignee: Fullscreen, Inc., Culver City, CA (US)

( * ) Notice: Subject to any disclaimer, the term of this patent is extended or adjusted under 35 U.S.C. 154(b) by 408 days.

(21) Appl. No.: 14/212,703

(22) Filed: Mar. 14, 2014

(65) Prior Publication Data
US 2014/0278968 A1 Sep. 18, 2014

Related U.S. Application Data

(60) Provisional application No. 61/786,345, filed on Mar. 15, 2013.

(51) Int. Cl.
*G06Q 30/02* (2012.01)
(52) U.S. Cl.
CPC .................. *G06Q 30/0249* (2013.01)
(58) Field of Classification Search
CPC ................................. G06Q 30/0249
USPC ...................................... 705/14.52
See application file for complete search history.

(56) References Cited

U.S. PATENT DOCUMENTS

2007/0288350 A1* 12/2007 Bykowsky ......... G06Q 30/0273
705/37

2012/0173315 A1* 7/2012 Martini .............. G06Q 30/0241
705/14.4

OTHER PUBLICATIONS

Doubleclick, Google, "Solutions for Publishers Maximize revenue from every stream," [online], http://www.google.com/doubleclick/publishers/solutions/video.html, Jun. 5, 2012, [retrieved Jul. 3, 2014], retrieved from https://web.archive.org/web/20120605212654/http://www.google.com/doubleclick/publishers/solutions/video.html, 2 pages.
Google Video Ads—Monetize your video content with DoubleClick, AdSense and You Tube, "Publisher video ad solutions," [online], http://www.google.com/ads/video/publishers, Nov. 29, 2011, [retrieved Jul. 3, 2014], retrieved from https://web.archive.org/web/20111129021233/http://www.google.com/ads/video/publishers, one page.

(Continued)

*Primary Examiner* — John Van Bramer
(74) *Attorney, Agent, or Firm* — Fish & Richardson P.C.

(57) ABSTRACT

In one implementation, a computer-implemented method includes receiving, at a computer system, a request to solicit one or more users to generate media content for a campaign; identifying, by the computer system, a plurality of content creating users; obtaining demographic data for a plurality of content consuming users who have accessed the media content that was generated by the plurality of content creating users; determining distributions of the plurality of content consuming users across a plurality of demographic categories; selecting, by the computer system, a portion of the plurality of content creating users based on a comparison of i) the one or more parameters for the campaign and ii) the distributions of the plurality of content consuming users across the plurality of demographic categories; and providing information that identifies an opportunity to generate media content for the campaign.

20 Claims, 14 Drawing Sheets

(56) References Cited

OTHER PUBLICATIONS

Tompros, Kalle, "How to Create the best YouTube Advertising Strategy," Search Engine Watch, [online], http://searchenginewatch.com, Jun. 13, 2012, [retrieved Jul. 3, 2014], retrieved from http://searchenginewatch.com, 5 pages.

Tompros, Kalle, "YouTube Advertising Options for Budgets of All Sizes," Search Engine Watch, [online], http://www.searchenginewatch.com, Apr. 25, 2012, [retrieved Jul. 3, 2014], retrieved from http://www.searchenginewatch.com, 6 pages.

YouTube Creator Blog, "The Official Youtube partners and Creators Blog," [online], http://youtubecreator.blogspot.com/2012/04/being-youtube-creator-just-got-even.html, Apr. 12, 2012, [retrieved Jul. 3, 2014] retrieved from http://youtubecreator.blogspot.com/2012/04/being-youtube-creator-just-got-even.html, 5 pages.

YouTube, "Build your global audience," [online], http://www.youtube.com/yt/creators/build-audiences.html, Apr. 13, 2012, [retrieved Jul. 3, 2014], retrieved from http://www.archive.org/web/20120413165242/http://www.youtube.com/yt/creators/build-audiences.html, 1 page.

YouTube, Partner Benefits, "YouTube Partner Program," [online], http://www.youtube.com/creators/partner.html, Apr. 13, 2012, [retrieved Jul. 3, 2014], retrieved from https://web.archive.org/web/20120413165248/http://www.youtube.com/yt/creators/partner.html, 2 pages.

\* cited by examiner

FACILITATING USER-GENERATED CONTENT

CROSS-REFERENCE TO RELATED APPLICATIONS

This application claims priority to U.S. Provisional Application Ser. No. 61/786,345, entitled "USER-GENERATED CONTENT FOR PROMOTIONAL CAMPAIGNS" and filed on Mar. 15, 2013, the entire contents of which are hereby incorporated by reference.

TECHNICAL FIELD

This specification generally describes computer-based techniques, methods, system, and computer program products for facilitating the creation and/or distribution of user-generated content.

BACKGROUND

Promotional campaigns, such as advertising campaigns, have traditionally involved publishing promotional information, such as ads, for the campaign in association with media content, such as televisions shows and news articles. For example, an advertising campaign for a new pair of running shoes may include multiple different ads for the new running shoe that are generated by the company making the running shoe. Such ads can be presented through various media channels, such as print ads in a magazine or newspaper, video ads that are played during commercial breaks on television, and/or online ad that are displayed in designated advertising areas on web pages.

SUMMARY

This document generally describes techniques, methods, systems, and computer program products for facilitating the creation and distribution of user-generated media content that includes particular information and/or messages, such as promotional information for a promotional campaign. For example, a company may want to promote its new product through the words and actions of users, and outside of the context of traditional promotional campaigns involving promotional information that is generated by professional advertisers/marketers and distributed through traditional advertising channels, such as television, print media, and online advertising. To facilitate such user-generated media-content, a computer system can provide opportunities to users to generate media content (e.g., videos, images, music) that includes a particular information and/or a message, and, as the media content is accessed by other users through one or more media distribution systems (e.g., social networks computer systems, video streaming services, music streaming services), the computer system can provide compensation (e.g., money, credits, prizes) to the users who generated the media content.

In one implementation, a computer-implemented method includes receiving, at a computer system, a request to solicit one or more users to generate media content for a campaign, the request including information that identifies one or more parameters for the campaign; identifying, by the computer system, a plurality of content creating users who have each generated media content that has been accessed by at least a threshold number of users; obtaining demographic data for a plurality of content consuming users who have accessed the media content that was generated by the plurality of content creating users, wherein the plurality of content creating users are different from the plurality of content consuming users; determining, based the demographic data and the plurality of content creating users, distributions of the plurality of content consuming users across a plurality of demographic categories, wherein each of the distributions i) corresponds to one of the plurality of content creating users and ii) comprises a distribution, across the plurality of demographic categories, of a portion of the plurality of content consuming users who accessed media content that was generated by the one of the plurality of content creating users; selecting, by the computer system, a portion of the plurality of content creating users based on a comparison of i) the one or more parameters for the campaign and ii) the distributions of the plurality of content consuming users across the plurality of demographic categories; and providing, by the computer system and to one or more computing devices that are associated with the selected portion of the plurality of content creating users, information that identifies an opportunity to generate media content for the campaign.

Certain implementations may provide one or more of the following advantages. For example, information and/or messages (e.g., promotional information and/or messages) can be embedded within user-generated media content so as to more effectively reach its intended audience. For instance, users may be more receptive to a message that is contained within a video generated by a user and that includes a clip of the user reviewing a new product than that same message being provided via an advertisement presented on television or on a web page as a designated advertisement (e.g., banner ad).

In another example, entities (e.g., companies, individuals) can have information and/or messages (e.g., promotional information and/or messages) reach intended audiences indirectly through the selection of particular content creators to present with opportunities to generate media content that includes the information and/or messages. For instance, if a company wants a promotional message to be embedded within user-generated videos (example media content) that are likely to be viewed by users who are male and between the ages of 18 and 35 (example demographic information), content creators can be selected based on how closely the demographics of their historical audience (users who viewed the previous videos that were generated by the content creators) match the desired demographics of the target audience (male, ages 18-35). For instance, a first content creator who has created videos that have been viewed by an audience where 75% of the viewers were males between the ages of 18-35 may be selected over a second content creator who has created videos that have been viewed by an audience with 10% of its viewers being males between the ages of 18-35. In such an example, an opportunity to generate a video that includes the promotional message of the example company can be provided to the first user (and not to the second user) based on the target audience closely matching the historical audience of the first user.

In a further example, content creators can be provided with incentives to generate effective media content, which can improve the quality of user-generated content and can allow for particular information and/or messages (e.g., promotional information and/or messages) to more effective reach targeted audiences. For example, content creators can be provided with compensation (e.g., money, credits, prizes) based on their content being accessed by users (e.g., viewed, played) and/or actions that their content can cause users to perform (e.g., selecting a link, subscribing to a channel, visiting a particular web page, purchasing a product). Users can be compensated on a per view/action basis (e.g., paid $0.25 for each user who accesses their media content) and there can be fixed compensation pools (e.g., $1,000 for a campaign) from which compensation can be doled out as earned on a first come first served basis. In light of such a framework, content creators may have an incentive to generate media content that is presently appealing to media consumers (e.g., viewers, listeners) so that the media content is accessed early and often by users—allowing a content creator to capture more of the fixed compensation pool before it is depleted.

In another example, entities (e.g., companies, organizations, individuals, governmental agencies) that are funding campaigns (e.g., promotional campaigns) can benefit by only paying for results associated with the campaign. For instance, in traditional advertising and marketing such entities will generally pay for the creation of promotional information and then will pay for distribution of the promotional information to users. In contrast, the technology disclosed in this document permits an entity to pay only for the presentation of promotional information to an audience (e.g., pay per view, pay per action)—content creators can be compensated only for results and not for the creation of media content that is generated the media content. Based on such a framework, entities that are funding campaigns can obtain more efficient and effective results for the money being spent on the campaigns.

In a further example, advertisers can be allowed to choose a subset of the views for a video or other media content that are credited and compensated as part of the campaign (e.g., promotional campaign). The subset of views can be selected based on one or more parameters that are relevant to the target audience of the campaign, such as demographic information like geographic location, age, and/or gender. Accordingly, an advertiser may only have to pay for views that have been selected (e.g., reached a target audience) for the campaign and likewise, the content creators are only paid for those views that have been selected. For example, an advertiser can choose what views to pay for based on the country from which the views occurred. For instance, a US-based advertiser could choose to run a campaign and the opportunity to participate in the campaign can be presented creators worldwide, but only views that occur in the US would be paid for by the advertiser.

The details of one or more implementations of the subject matter described in this specification are set forth in the accompanying drawings and the description below. Other potential features, aspects, and advantages of the subject matter will become apparent from the description, the drawings, and/or the claims.

BRIEF DESCRIPTION OF DRAWINGS

Like reference symbols in the various drawings indicate like elements.

DETAILED DESCRIPTION

This document generally describes techniques, methods, systems, and computer program products for facilitating the creation and distribution of user-generated media content that conveys particular information and/or particular messages, such as promotional information for a promotional campaign. For example, an organization that has a new public awareness campaign may want to have a central message for the campaign, such as a message that texting while driving is dangerous, propagated by users through user-generated media content, such as videos, images, and/or music. The organization can provide a request for its promotional campaign to a computer system that can identify users to provide with an opportunity to participate in the campaign, can manage the spending and awarding of funds for the campaign to participating users based on the results (e.g., media content views, actions performed by a user) generated by their user-generated media content, and can monitor for fraudulent enhancement of results. These features and others are descried in greater detail below with regard to the Figures.

Figure 1:
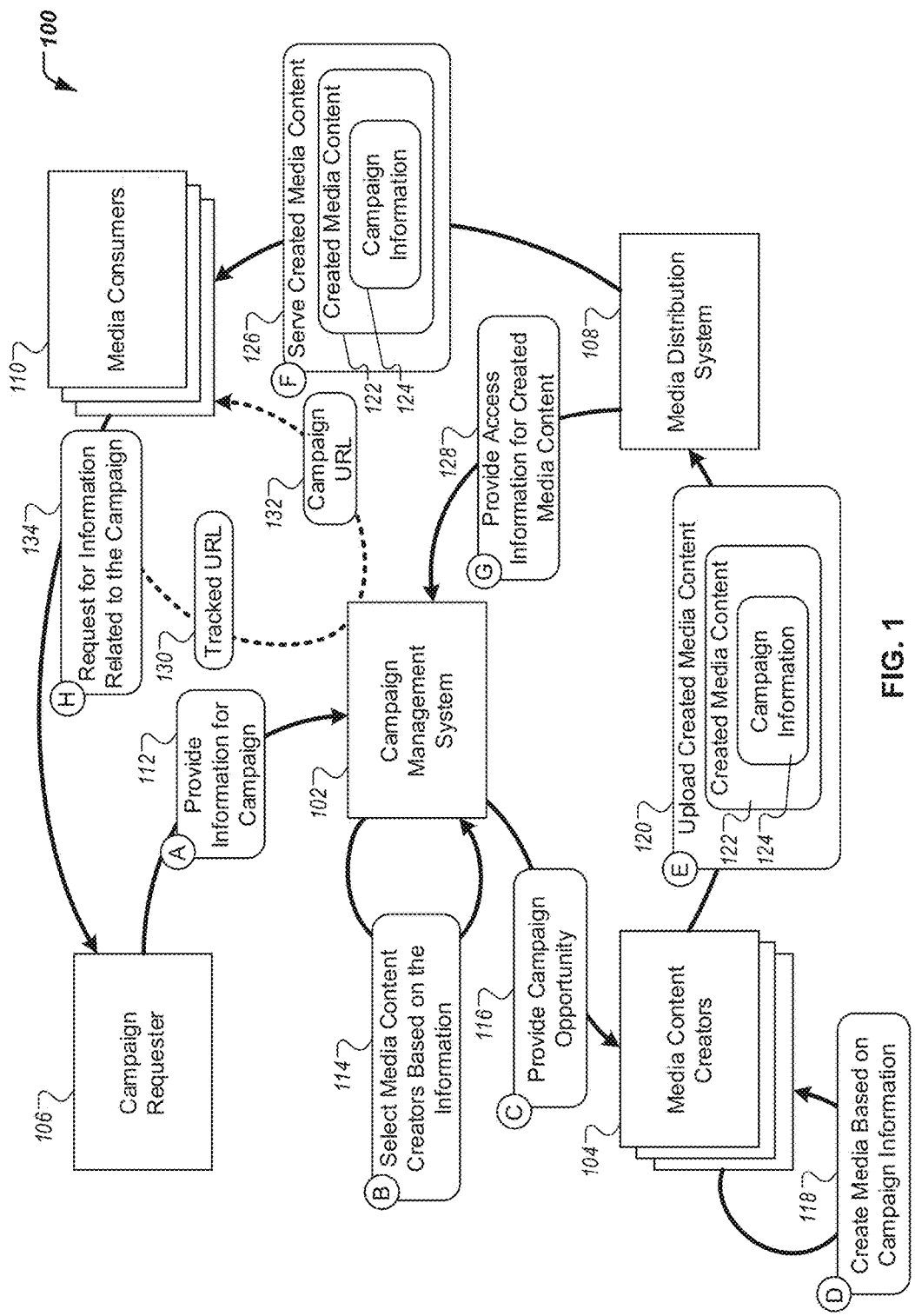
FIG. 1 depicts a conceptual diagram of an example computer system for facilitating the creation and distribution of user-generated media content that conveys particular information and/or particular messages.

FIG. 1 depicts a conceptual diagram of an example computer system 100 for facilitating the creation and distribution of user-generated media content that conveys particular information and/or particular messages. The example computer system 100 includes a campaign management system 102 (e.g., promotional campaign management system) that can facilitate the creation and distribution of media content by media content creators 104 for a campaign (e.g., a promotional campaign) that has been requested by a campaign requester 106 (e.g., an advertiser). The media content creators 104 can upload media content for the campaign to a media distribution system 108 from which media consumers 110 can access the uploaded media content and can perform actions related to the campaign, such as visiting one or more web pages that are associated with the campaign.

Although the example system 100 is depicted and described with regard to a campaign, such as a promotional campaign that promotes something (e.g., product, service, entity, message, event, other media content or channels, users), the example system 100 and the associated actions (e.g., steps A-H) that are described may be implemented outside of the context of a campaign. Instead, in such implementations, the campaign requester 106 may simply issue a request for media content to be created that conveys particular information and/or particular messages, and the campaign management system 102 can facilitate the engagement of appropriate media content creators 104 to create the requested media and/or the distribution of such media content through the media distribution system 108. Such requests may not have associated durations during which compensation funds are available for distribution to participating users. Instead, such requests may include providing compensation to participants in any of a variety of other appropriate ways, such as through fixed levels of compensation for participation (e.g., $50 for creating media content).

The campaign management system 102, the campaign requester 106, the media content creators 104, the media distribution system 108, and the media consumers 110 can each be any of a variety of appropriate computer systems, such as a desktop computer, a laptop computer, a mobile computing device (e.g., smartphone), a distributed computing system (e.g., cloud computing system), a server system, or any combination thereof. The interactions among the components 102-110 can be over one or more computer networks, such as a local area network (LAN), a wide area network (WAN), a virtual private network (VPN), a wireless network, a wired network, a fiber optic network, the internet, or any combination thereof. In some implementations, the campaign management system 102 and the media distribution system 108 can be part of the same computer system.

The campaign requester 106 can be associated with one or more entities (e.g., companies, organizations, individual users, groups, governmental agencies) and can provide information for a campaign to the campaign management system 102, as indicated by step A (112). The information for the campaign, which can be a promotional campaign (e.g., a campaign to promote one or more subjects of the campaign, such as a product, service, message, and/or other information), can include a variety of details related to the campaign, such as an overarching message for the campaign (e.g., "don't text and drive," a promoted product or service), a target demographic for the campaign (e.g., gender, age, location, language), an overall budget for the campaign (e.g., $1,000 for the campaign, 100 free products to be awarded to content creators), a level of compensation per view/action (e.g., $0.25/view, $1.00/click of a link, $1.50/ subscription on a social network, $0.30/action indicating social engagement (e.g., likes of media content, comments associated with media content, shares of media content)), a start date for the campaign, a duration for the campaign, and/or one or more content categories (content verticals) for the campaign (e.g., fashion, sports, beverages). For example, the campaign requester 106 can provide information for a promotional campaign related to a new product that a company associated with the campaign requester 106 is launching.

The campaign management system 102 can receive the information for the campaign and can proceed to select, based at least in part on the received information, one or more media content creators from a group of media content creators to provide with opportunities (e.g., invitations, offers) to create media content for the campaign, as indicated by step B (114). For example, the group of media content creators can be users who have been identified by the campaign management system 102 as producing quality media content and having at least a threshold level of notoriety/popularity among content consumers (e.g., users whose videos receive at least an average threshold number of views within a period of time of having been uploaded to the media distribution system 108). The one or more media content creators can be selected from such a group based on a variety of factors, such as demographic information for a content creator's audience (other users who access (e.g., view, listen to) media content created by the content creator) and/or content categories that are associated with media content generated by a content creator.

For example, the campaign requester 106 can specify in the information that the campaign is intended to target males between ages 18-25. The campaign management system 102 can identify demographic information for users who have viewed content that was created by each member of a group of content creators and can determine distributions of the viewing users across one or more demographic categories (e.g., gender, age, location, language). Content creators who are determined to have at least a threshold proportion of their audience fall within one or more demographic categories that correspond to, for example, males between the ages of 18 and 25, as specified by the campaign requester 106, may be selected to receive an opportunity (e.g., offer) to participate in the campaign for the campaign requester 106. By selecting content creators based on the demographics of their audience, the campaign management system 102 can increase the likelihood that the one or more messages for the campaign reach the target audience (e.g., males between 18 and 25).

The campaign management system 102 can provide opportunities to participate in the campaign to one or more of the media content creators, as indicated by step C (116). Such an opportunity can include a variety of details regarding the campaign, such as a level of compensation (e.g., $0.25/view, $1.00/action, flat offer for participation in the campaign (e.g., $200 to generate media content that includes campaign information)), an available budget for the campaign, duration of the campaign, and/or a start date for the campaign. The opportunity may be provided to the one or more media content creators 104 in any of a variety appropriate ways, such as through a message that is sent to the content creators 104 (e.g., email, text message, chat message), a push notification that is provided to an application installed by the content creators 104 (e.g., a mobile application), and/or in a web page that is provided upon request from the media content creators 104, such as a user interface through which the media content creators 104 interact with the campaign management system 102. The opportunity provided in step C (116) may be presented with one or more other campaign opportunities for which the media creators 104 were selected by the campaign management system 102. The campaign opportunities can be presented to the media content creators 104 with details about the campaigns (e.g., description of campaign, message to be promoted, budget, compensation) and the media creators 104 can select which campaigns to participate in.

The media content creators 104 who opt to participate in the campaign can create media content based on the information for the campaign, as indicated by step D (118). For example, a campaign for a new pair of shoes may identify information (e.g., features of shoes, date when becoming available in stores, locations where the shoes can be purchased, and messages regarding the shoes) regarding the new pair of shoes that should be included in the user-generated media content. Such information may not be a script that a user has to include in the media content, but instead may outline particular bits of information that should appear in the user-generated media content to qualify for participation in the campaign. Aside from the campaign information, the media content creators 104 can be given free reign as to other details of the user-generated media content, such as themes, characters, styles, editing, equipment, and/or scripts. By allowing free reign over other details, the user-generated media content that is created by the media content creators 104 can be diverse and, collectively, can appeal to a broader range of the media consumers 110. Additionally, by having particular campaign information appear within user-generated media content, the media consumers 110 may more receptive to the information than if the same campaign information were to be presented to the media consumers 110 through traditional media channels (e.g., user testimonials in television and magazine advertisements). Furthermore, by allowing media content creators 104 to have autonomy, the user-generated media content can more readily and quickly conform to current popular trends, such as trends that are presented in "viral videos" (videos that rapidly become popular through sharing among users on the internet).

As indicated by step E (120), the media content creators 104 can upload user-generated media content 122 that includes the campaign information 124 to the media distribution system 108 (e.g., YOUTUBE, VIMEO, VINE). The media distribution system 108 may be part of or separate from the campaign management system 102. Although not depicted, the media content creators 104 may additionally or alternatively provide the media content 122 (or a link on the media distribution system 108 thereto) to the campaign management system 102 for review and acceptance into the campaign. For instance, the campaign management system 102 may review the media content 120 to verify that it includes the campaign information 124 before enrolling it in the campaign and providing compensation to a media content creator who generated the media content 122.

Once uploaded to the media distribution system 108, the created media content 122 can be served to the media consumers 110, as indicated by step F (126). The media content 122 can be served in any of a variety of appropriate ways, such as in response to a specific request for the media content from the media consumers 110 (e.g., selection of a link for the media content 122) and/or in association with other media content that has been requested by the media consumers 110 (e.g., presentation of the media content 122 before presenting other media content that has been requested, for example, as a pre-roll advertisement). For example, the media consumers 110 may discover the media content 122 and transmit requests for the media content 122 to the media distribution system 108 through one or more protocols (e.g., HTTP, FTP), in response to which the media distribution system 108 can provide the media content 122 to the media consumers 110. The media consumers 110 may discover the media content 122 in any of a variety of ways, such as being notified of the media content 122 being posted to a channel (e.g., channel of one of the media content creators 104) to which the media consumers 110 subscribe, being posted on a web page (e.g., social network, blog), recommendations from other users (e.g., link provided via a message), and/or through the media content 122 being returned as a result for a query (e.g., query on the media distribution system 108, search query provided to a search engine). The media content creators 104 may actively promote the media content 122, such as by posting it to social networking websites.

In another example, the media content 122 can be provided to the media consumers 108 without being specifically requested by the media consumers 108 and in association with other content that has been requested by the media consumers 108, such as web pages, other media content (e.g., videos, photos, audio files), and/or application content. For instance, the media distribution system 108 can provide the media content 122 to the media consumers 110 when other content that is part of the same (or related) channel as the media content 122 has been requested. For example, when a media consumer 110 requests a video that is part of the same channel as the media content 122, the media distribution system 108 can serve the media consumer 110 with the requested video, the media content 122, and one or more portions of code that cause the media consumer 110 (e.g., computing device) to present the media content 122 in association with the requested video. Such associative presentation of the media content 122 can include any of a variety of appropriate ways to present content as being associated, such as through sequential presentation (e.g., presentation of the media content 122 before the requested content (e.g., as a pre-roll advertisement), presentations of the media content 122 during or after the requested content), proximate presentation (e.g., presenting the media content 122 nearby the requested content), and/or through visual effects that cause the media content 122 and the requested content to appear to be related (e.g., similar sizing, font, graphical features, audio features, location, orientation). Such intra-channel presentation of the media content 122 with other requested content can be advantageous for a variety of reasons, such as having a higher probability that the media content 122 will be of interest to the media consumers 110, who have requested content from the same or related channel, than if the media content 122 were to be provided at random with other content.

As the media content 122 is served to the media consumers 110, the media distribution system 108 can log information regarding the media consumers 110 accessing (e.g., downloading, streaming, viewing, listening to) the media content 122, such as information that identifies a time at which the media content 122 was accessed, identifies the media consumers 110 who accessed the media content 122, and/or a path through which the media consumers 110 requested the media content 122 (e.g., web page visited prior to requesting the media content 122). The media distribution system 108 can additionally log information regarding actions that indicate engagement by the media consumers 110 with the media content 122, such as the media consumers 110 performing one or more of the following actions in association with the media content 122: "liking" or "disliking" the media content 122 (e.g., selecting a like or dislike button), rating the media content 122 (e.g., selecting a rating value along a rating scale for the media content 122), commenting on media content 122 (e.g., posting a comment, participating in a dialog associated with the media content 122), sharing the media content 122 (e.g., sharing a link to the media content 122, reposting the media content 122), and/or viewing the media content 122 for a duration of time (e.g., the media consumers 110 stop viewing the media content 122 before it has reached its end, such as stopping a video before it has finished playing; the media consumers 110 view the media content 122 in its entirety, such as watching a video in its entirety, the media consumers 110 viewing the media content 122 for at least a threshold duration of time).

As indicated by step G (128), the media distribution system 108 can provide access information that describes accessing and/or engagement of the media content 122 hosted at the media distribution system 108 by the media consumers 110. The step G (128) may be performed in response to a request from the campaign management system 102 and/or it may be periodically performed by the media distribution system 108 without a specific request from the campaign management system 102. In some implementations, the campaign management system 102 may obtain permission from the media content creators 104 to obtain the access information and may provide verification of that permission to the media distribution system 108, which can permit the campaign management system 102 to obtain access information that is associated with accounts for the media content creators 104 on the media distribution system 108.

The campaign information 124 may additionally include one or more URLs to resources (e.g., web pages, social networking profiles, mobile applications) that are associated with the campaign and that are to be included in the media content 122 by the media content creators 104. For example, the URLs can be provided as links that are superimposed over portions of a video. In another example, the URLs can be provided as selectable links in content that displayed near and that describes a video. To track selection of such URLs by the media consumers 110 in association with the campaign, the URLs may be tunneled such that a tracked URL 130 that corresponds to a resource at the campaign management system 102 is provided with the media content 122. When the campaign management system 102 receives a request for the tracked URL 130, the campaign management system 102 can provide a redirect instruction with a campaign URL 132 to the media consumers 110, which can cause the media consumers 110 to automatically redirect to the campaign URL 132. The campaign URL 132 can correspond to the one or more URLs to resources (e.g., web pages, social networking profiles, mobile applications) that are associated with the campaign. In response to receiving the campaign URL 132, the media consumers 110 can transmit a request for information (e.g., a web page, a social network profile, an application) related to the campaign, as indicated by step H (134). Such a request for information related to the campaign may constitute an action, or part thereof, for which the media content creators 104 receive compensation as part of the campaign. Accordingly, instances when the tracked URL 130 is received by the campaign management system 102 can be logged, similar to the logging of access information by the media distribution system 108, and can be used, alone or in combination with the access information, to determine compensation for the media content creators 104 who created the media content 122 for the campaign.

Figure 2A:
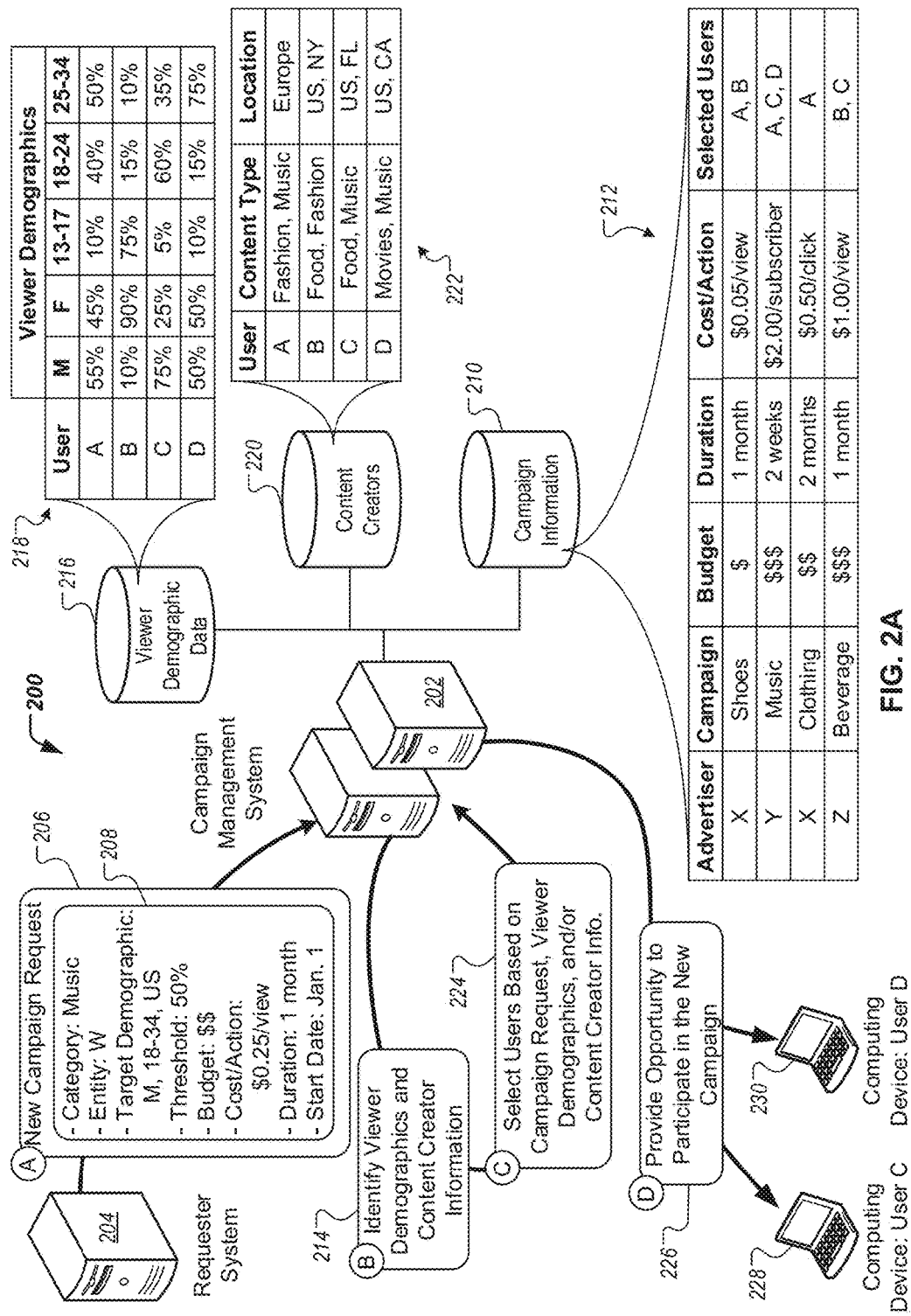
FIGS. 2A-B are conceptual diagrams of an example system for facilitating the creation and distribution of user-generated media content that conveys particular information and/or particular messages.
Figure 2B:
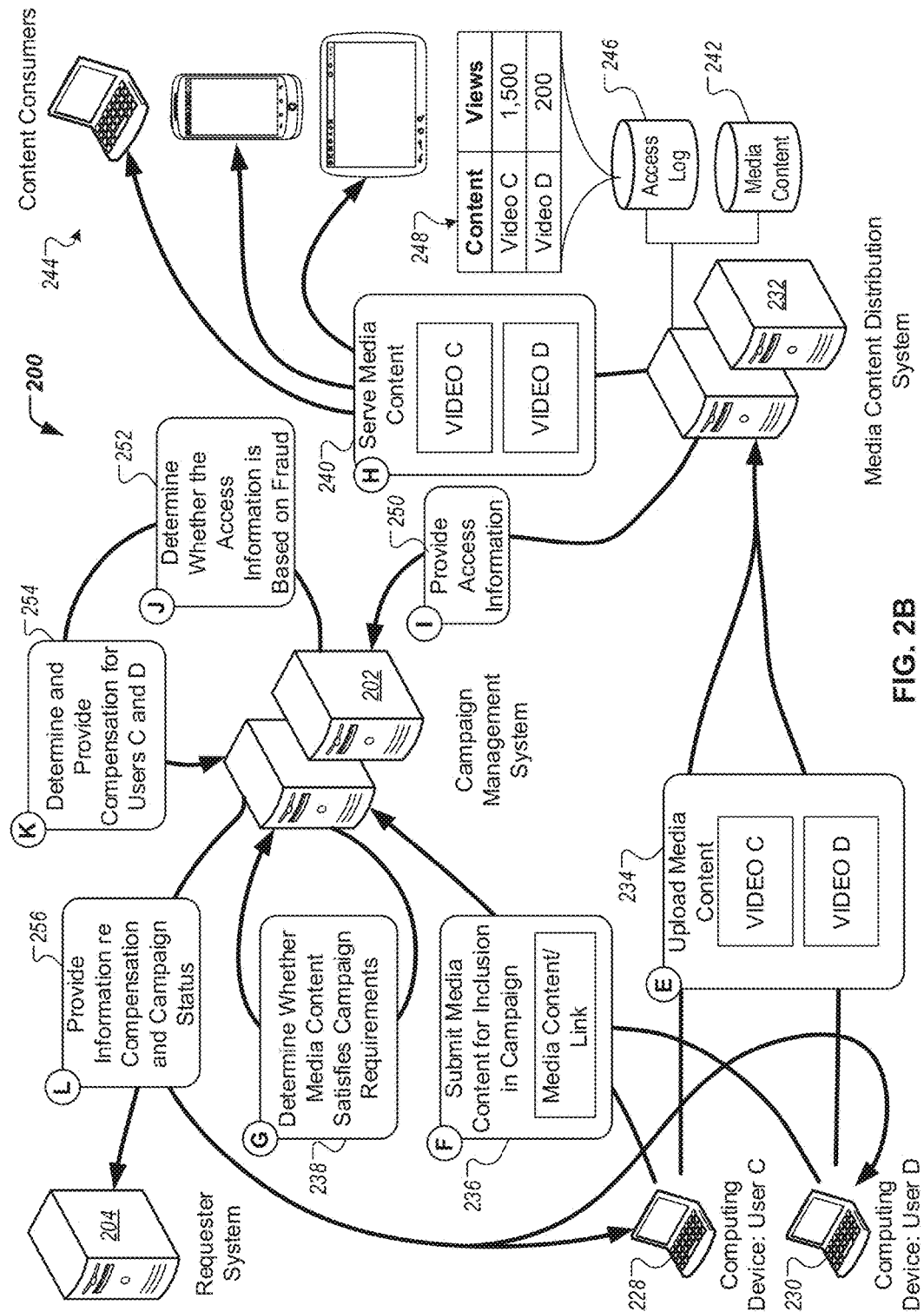

FIGS. 2A-B are conceptual diagrams of an example system 200 for facilitating the creation and distribution of user-generated media content that conveys particular information and/or particular messages, such as promotional information and/or promotional messages as part of a promotional campaign. The portion of the system 200 that is depicted in FIG. 2A is generally directed to selecting content creators for a particular campaign, such as a promotional campaign that is promoting something (e.g., product, service, message, entity). The portion of the system 200 that is depicted in FIG. 2B is generally directed to distributing user-generated media content as part of the campaign and providing compensation to content creators based on content consumers having viewed the user-generated media content.

Although the example system 200 is depicted and described with regard to a campaign, such as a promotional campaign that promotes something (e.g., product, service, entity, message, event, other media content or channels, users), the example system 200 and the associated actions (e.g., steps A-L) that are described may be implemented outside of the context of a campaign. Instead, in such implementations, the requester system 204 may simply issue a request for media content to be created that conveys particular information and/or particular messages, and the campaign management system 202 can facilitate the engagement of appropriate media content creators, such as computing devices 228 and 230, to create the requested media and/or the distribution of such media content through the media distribution system 232. Such requests may not have associated durations during which compensation funds are available for distribution to participating users. Instead, such requests may include providing compensation to participants in any of a variety of other appropriate ways, such as through fixed levels of compensation for participation (e.g., $50 for creating media content).

Referring to FIG. 2A, the example system 200 includes a campaign management system 202 that is configured to receive a request to create and manage user-generated media content that conveys particular information and/or a particular message, such as part of a new campaign (e.g., promotional campaign). Such a request can be received from a requester system 204 (e.g., an advertiser system), as indicated by step A (206). The campaign management system 202 can be similar to the campaign management system 102 and the requester system 204 can be similar to the requester system 106 described above with regard to FIG. 1. Example campaign information 208 is depicted as identifying a variety of information for the campaign, such as a content category for the campaign ("music"), a name of the entity requesting the campaign ("W"), a target demographic for the campaign (males between ages 18-34 who live in the US), a minimum threshold of a content creator's audience that has to fall within the target demographic for the content creator to qualify to participate in the campaign ("50%"), a total budget for the campaign ("$$"), an amount of compensation that will be paid out to participants ("$0.25/view"), a duration for the campaign ("1 month"), and a start date for the campaign ("January 1"). Other and/or alternate information may be included in the request 206, such as information that should be included in user-generated content for the user-generated content to be included in the campaign (e.g., a message to be presented in the user-generated content, features of a product to be discussed, relevant dates, locations where users can obtain additional information and/or make purchases), flat compensation offers for campaign participation (e.g., $100 to create media content for a campaign regardless of the number of views of the created content), and/or offers for compensation based on actions indicating engagement with the media content (e.g., compensation based on likes and dislikes, sharing of the media content, and/or positive comments based on comment sentiment analysis).

The information for the new campaign can be stored in a campaign information repository 210 that can store information for campaigns that are being facilitated and managed by the campaign management system 202. An example table 212 of information for other campaigns is depicted. As indicated in table 212, campaigns can vary in their subject matter (e.g., ranging from clothing to movies and to beverages), in their budget, in their duration (e.g., ranging from a couple weeks to a couple months), in their compensation structure (e.g., varying levels of payment for content views, clicks, and executed subscriptions), and in the users (content creators) who are selected to receive opportunities to generate media content for the campaigns. The campaign management system 202 can store the information 208 for the new campaign from the requester system 204 in the campaign information repository 210 in a similar manner as demonstrated in table 212.

In response to receiving the campaign request, the campaign management system 202 can identify viewer demographics and content creator information, as indicated by step B (214). For example, the campaign management system 202 can access information from a viewer demographic data repository 216 that stores demographic information regarding audiences (users) who have viewed content that has been generated by content creators. The viewer demographic data repository 216 can include information that identifies quantities/ratios of content consumers (e.g., viewers) who have viewed and, in some implementations, had at least a threshold level of engagement with content created by users (content creators) across various demographic categories (e.g., gender, age ranges, locations, languages). For example, for the user A, a first distribution of content consumers who have viewed content that was generated by user A is provided across gender—40% of these content consumers have been male and 60% have been female. A second distribution of the same content consumers is provided across a few example age ranges—10% of these content consumers have been between ages 13-17, 40% have been between ages 18-24, and 50% have been between ages 25-34. Although depicted as separate, demographic categories can be combined to provide demographic distributions for a content creator. For example, the two demographic distributions that are provided in the table 218 can be combined to identify content consumers who have been male and ages 13-17, female and ages 13-17, and so forth. Viewer demographics may be additionally (or alternatively) based on engagement with media content across different demographic distributions. For example, the demographic distributions in table 218 may be based on viewers that have had at least a threshold level of engagement (e.g., based on likes/dislikes, shares, comments, duration of view, and/or other appropriate indicators of engagement).

The group of content consumers from which the demographic distributions are generated for the content creators A-D can be different. For example, the group of users who viewed media content that was generated by content creator A can be different from the group of users who viewed media content that was generated by content creator B. There can be overlap between such groups of content consumers, but the exact composition of these groups may differ. The viewer demographics data 216 can store raw data (e.g., logs of content views and/or content engagement that include information identifying demographic information for viewers and the content creators whose content has been viewed) and/or collated data, such as the data presented in the table 218. The viewer demographic data 216 may be maintained by a media content distribution system, such as the media distribution system 108, and access to the demographic data 216 may be provided to the campaign management system 202, in some implementations, based on permissions obtained from the content creators to whom the demographic information pertains.

There may be a temporal aspect to what demographic data is used for a content creator. For example, one can imagine that the content created by a user may change over time and, accordingly, the demographics of the audience for the content creator may also change. Accordingly, using all of the demographic data that is available for a content creator may provide an inaccurate depiction of a content creator's current audience, which is what the campaign management system 202 and the requester system 204 can be interested in identifying. Demographic data that is used to generate one or more demographic distributions of an audience for a content creator can be selected based on how recently the demographic data was recorded (e.g., how recently an action that caused the demographic data to be recorded, such as viewing media content, occurred). For instance, the demographic data that is used to generate demographic distributions may be time limited (e.g., occurred within the last week, month, year, 5 years). The time window for limiting the demographic data that is used can be fixed and/or it can be dynamic based on the size of the data pool for a particular content creator. For example, the time window may go back in time until a threshold number of users and/or actions have been identified for a particular content creator (e.g., adjust the time window so that the N number of most recent views of content generated by user A have been identified).

The campaign management system 202 may additionally access information about content creators from a content creator repository 220 that can include information regarding content creators, such as the typical subject matter of the content that they create, one or more locations where the content creators live, and/or one or more language that the content creators speak. As depicted in the example table 222, information regarding types of content that the content creators A-D generate and locations where the content creators A-D live are presented. Information regarding content creators can also be relevant to whether a content creator is selected to receive an opportunity to participate in a campaign by the system 202. For example, a user from a particular geographic region will likely be able to generate media content that appeals to an audience within that geographic region than another user who is from another geographic region. In another example, a user who is familiar with a particular type of subject matter may be able to generate media content regarding that subject matter that will be more appealing to an audience than media content created by another user who is not familiar with the subject matter.

The campaign management system 202 can select users (content creators) based on the information 208 from the campaign request, the viewer demographic information 218, and/or the content creator information 222, as indicated by step C (224). For example, the system 202 can identify content creators who satisfy the parameters set forth in the information 208. In the example presented in FIG. 2A, the target demographic is identified as males, ages 18-34, in the US; the threshold demographic level is identified as 50%; and the content category for the campaign is identified as music. Referring to the table 218, the content creators A, C, and D can be determined satisfy the male and age demographic parameters of the information 208. Referring to table 222, the content creators C and D can be determined to satisfy the type of content and location parameters of the information 208. Accordingly, the content creators C and D can be selected and provided with opportunities to participate in the new campaign, as indicated by step D (226). The opportunities can be provided to one or more computing devices 228 and 230 that are associated with user C and user D, respectively.

Referring to FIG. 2B, the content creators C and D can generate videos C and D, respectively, and can upload them to a media content distribution system 232, as indicated by step E (234). The media content distribution system 232 can be similar to the media content distribution system 108. The content creators C and D can also, before, after, or concurrently with uploading the media content in step E (234), submit the media content (videos C and D) or links thereto to the media campaign management system 202 for inclusion in the campaign, as indicated by step F (236).

In response to receiving the media content or links to the media content, the media campaign management system 202 can determine whether the media content (videos C and D) satisfy the requirements of the campaign, as indicated by step G (238). For example, the media campaign management system 202 can determine whether the information that the requester system 204 has requested be included in media content that is part of the campaign, such as a message, a discussion of particular features, and/or logistical details being mentioned (e.g., time, date, location), is included in the media content generated by the users C and D. If the requested information is present, then the media content can be approved for inclusion in the campaign. If the requested information is not present, than the media campaign management system 202 may reject the media content submission and provide notice to the associated content creator as to the deficiencies of the media content. The media campaign management system 202 can make such determinations in any of a variety of appropriate ways, such as through digital image processing techniques, speech to text conversion techniques, textual analysis techniques, and/or through feedback from human users who have reviewed the media content.

As indicated by step H (240), the media content distribution system 232 can serve media content that is stored by the system 232 in a media content repository 242 to one or more content consumer computing devices 244. The system 232 can serve the media content based on requests (for the media content and/or for other media content) from the content consumer computing devices 244. Each time content is accessed by one of the content consumers 244, the system 232 can record information regarding the access and/or engagement with the content in an access log 246. As depicted in the example table 248, the video C has been accessed 1,500 times by the content consumers 244 over a period of time (e.g., period of time spanning from when the video C was uploaded to the system 232 to the current time) and the video C has been accessed 200 times by the content consumers 244. The media content distribution system 232 can provide such access information (e.g., the table 248, views, engagement), to the campaign management system 202, as indicated by step I (250).

As indicated by step J (252), the media campaign management system 202 can determine whether the access information (e.g., table 248, views, engagement) is based, at least in part, on fraudulent activity. For example, the users C and D have an interest in increasing a number of times that the media content that they created is accessed so as to increase their compensation for the campaign. To ensure integrity of the system, the media campaign management system 202 can perform one or more fraud monitoring techniques. In one example technique, the system 202 can determine a ratio of unique users/computing devices that accessed the media content to an overall number of times that the media content was accessed. If the ratio falls below a threshold level (e.g., 10%, 20%, 25%, 33%, 50%, 66%, 75%, 80%), the system 202 may determine that there is a high likelihood of fraud and may flag the user and his/her media content for further review by a person. In another example technique, if there are deviations from historical rates of views (e.g., number of views/day) and/or ratios of views to engagement (e.g., ratio of views/likes, ratio of views/dislikes, ratio of views/comments, ratio of views/shares) by at least a threshold amount (e.g., deviation of greater than 25%, 33%, 40%, 50%, 60%, 75%), then at least a portion of the access information (e.g., views, engagement) can be identified as likely being fraudulent. In such instances, the system 202 may also proceed to provide compensation to the user, but the system 202 may limit the compensation, such as being limited based on accesses/actions that were performed by unique users/computing devices and/or to accesses/actions that fit within historical rates and/or ratios for the content creator.

In another example technique, the system 202 can determine an average number of accesses/actions that a particular content creator receives for media content that the content creator uploaded for previous campaigns and can compare this average to the number of accesses/actions for the current campaign. If the system 202 determines that there is an upward deviation of at least a threshold level (e.g., 25%, 50%, 100%, 200%, one standard deviation, two standard deviations), then the system 202 can determine that there is a high likelihood of fraud and may flag the user and his/her media content for further review by a person. In such instances, the system 202 may also proceed to provide compensation to the user, but the system 202 may limit the compensation to being based on accesses/actions that were performed by unique users/computing devices. Other example techniques are also possible.

After performing the fraud detection and/or adjusting the media content accesses/actions that are determined to be subject to compensation, the system 202 can determine and provide compensation to the content creators who participated in the campaign (users C and D), as indicated by step K (254). The system 202 can determine the level of compensation based on the rate of compensation per action for the campaign ($0.25/view) and the number of accesses/actions that were performed by the content consumers 244 during the period of time for the campaign. For example, the user C generated the video C which received 1,500 views. The system 202 can determine the compensation for user C to be $375 (1,500×0.25). The system 202 may provide such compensation on a first come first served basis—meaning that the budget for the campaign is doled out to content creators as events that are subject to compensation (e.g., media content access, action performed based on media content access) are performed by the content consumers 244. Once the budget has been depleted, the compensation for such events ends.

The system 202 can provide information regarding compensation and the status of the campaign to the requester system 204 and the computing devices 228, 230 that are associated with the participating content creators (users C and D), as indicated by step L (256). The information provided can include a variety of details, such as a total remaining budget, an amount of compensation that has been awarded to the participating content creators, and/or an amount of time that is remaining for the campaign. Such information may be pushed to the computing devices 204, 228, and/or 230 (e.g., pushed to an application running on these computing devices) and/or provided upon request (e.g., provided as part of a web page that presents account information for the requester and/or the content creators on the system 202).

Figure 3:
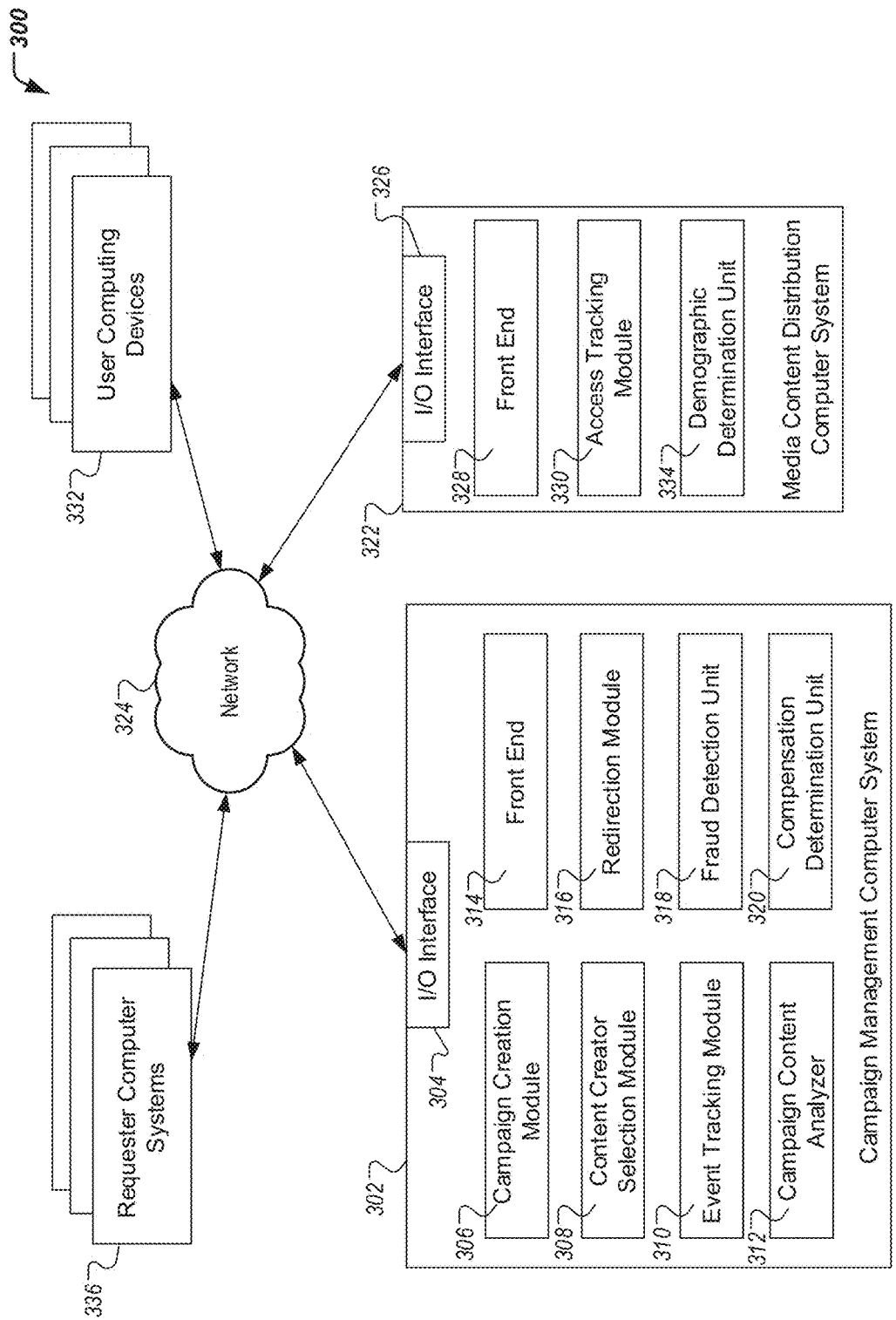
FIG. 3 depicts an example computer system for facilitating the creation and distribution of user-generated media content that conveys particular information and/or particular messages.

FIG. 3 depicts an example computer system 300 for facilitating the creation and distribution of user-generated media content that conveys particular information and/or particular messages, such as part of a campaign (e.g., promotional campaign). The computer system 300 includes a campaign management computer system 302 that can be similar to and that can be programmed to perform similar techniques as the campaign management systems 102 and/or 202 described above. As described above with regard to the systems 100 and 200 depicted in FIGS. 1-2, in addition to facilitating the creation and distribution of user-generated media content in association with campaigns, such as promotional campaigns that promote something (e.g., product, service, entity, message), the computer system 300 can also facilitate the creation and distribution of such user-generated media content based on requests that are not part of a campaign.

The computer system 302 can be any of a variety of appropriate computer systems, such as a desktop computer, a laptop computer, a mobile computing device (e.g., smartphone), a distributed computing system (e.g., cloud computing system), a server system, or any combination thereof. The computer system 302 includes an input/output (I/O) interface 304 (e.g., network card) through which the system 302 can communicate with other computing devices. The computer system 302 includes a campaign creation module 306 that can be programmed to provide an interface through which entities (e.g., advertisers, organizations, individuals) can create campaigns, such as promotional campaigns. The computer system 302 also includes a content creator selection module 308 that is programmed to select content creators to provide with opportunities to participate in a campaign. The computer system 302 can further include an event tracking module 310 that is programmed to monitor and obtain information regarding events that have been performed by content consumers for which a content creator may receive compensation, such as media content accesses, engagement with media content (e.g., likes/dislikes, shares, comments, duration of use), and/or actions performed by a content consumer based on accessed media content (e.g., subscribing to a channel associated with an advertiser, visiting a web page associated with an advertiser, purchasing a product or service, creating a user account).

The computer system 302 can additionally include a campaign content analyzer 312 that is programmed to determine whether information that was requested to be in media content for a campaign is included in candidate media content that was created by selected content creators. The computer system 302 can further include a front end 314 that can manage interactions with other computing devices, such as serving web pages. The computer system 302 can also include a redirection module 316 that can be programmed to generate tracked URLs that correspond to campaign URLs, to log receipt of particular tracked URLs, and to provide campaign URLs with redirect instructions to consumer computing devices. The computer system 302 can additionally include a fraud detection unit 318 that can be programmed to detect and correct for the occurrence fraudulent events for which compensation may be provided to a content creator. The computer system 302 can further include a compensation determination unit 320 that can be programmed to determine a remaining balance for a campaign and levels of compensation to provide to content creators.

The computer system 302 can interact with a media content distribution computer system 322 over a network 324, which can be similar to the distribution systems 108 and/or 232 described above. The network 324 can be any of a variety of appropriate computer networks, such as a local area network (LAN), a wide area network (WAN), a virtual private network (VPN), a wireless network, a wired network, a fiber optic network, the internet, or any combination thereof. In some implementations, the campaign management system 302 and the media distribution system 322 can be part of the same computer system.

The computer system 322 can include an I/O interface 326 and a front end 328, which can be similar to the I/O interface 304 and the front end 314. The computer system 322 can further include an access tracking module 330 that is programmed to track media content that is accessed by and/or engagement with through interaction with user computing devices 332 over the network 324. The computer system 322 can further include a demographic determination unit 334 that can be programmed to determine one or more demographic categories into which users accessing media content fall.

The user computing devices 332 may be associated with users who are content creators or content consumers. The system 300 can further include one or more requester computer systems 336 that provide requests for and fund campaigns that are managed by the computer system 302.

FIGS. 4A-D are flowcharts of an example technique 400 for facilitating the creation and distribution of user-generated media content that conveys particular information and/or particular messages, such as part of a campaign (e.g., a promotional campaign). Portions of the technique 400 are identified as being performed in part by a requester computer system 402 (e.g., the requester computer system 106, the requester system 204, the requester computer system 336), a campaign management computer system 404 (e.g., the campaign management system 102, the campaign management system 202, the campaign management computer system 302), a content creator computer system 406 (e.g., the media content creators 104, the computing devices 228 and 230, the user computing devices 332), a content distribution computer system 408 (e.g., the media distribution system 108, the media content distribution system 232, the media content distribution computer system 322), and a content consumer computer system 410 (e.g., the media consumers 110, the content consumers 244, the user computing devices 332). As described above with regard to the systems 100, 200, and 300 depicted in FIGS. 1-3, in addition to facilitating the creation and distribution of user-generated media content in association with campaigns, such as promotional campaigns that promote something (e.g., product, service, entity, message), the technique 400 can also facilitate the creation and distribution of such user-generated media content based on requests that are not part of a campaign.

Figure 4A:
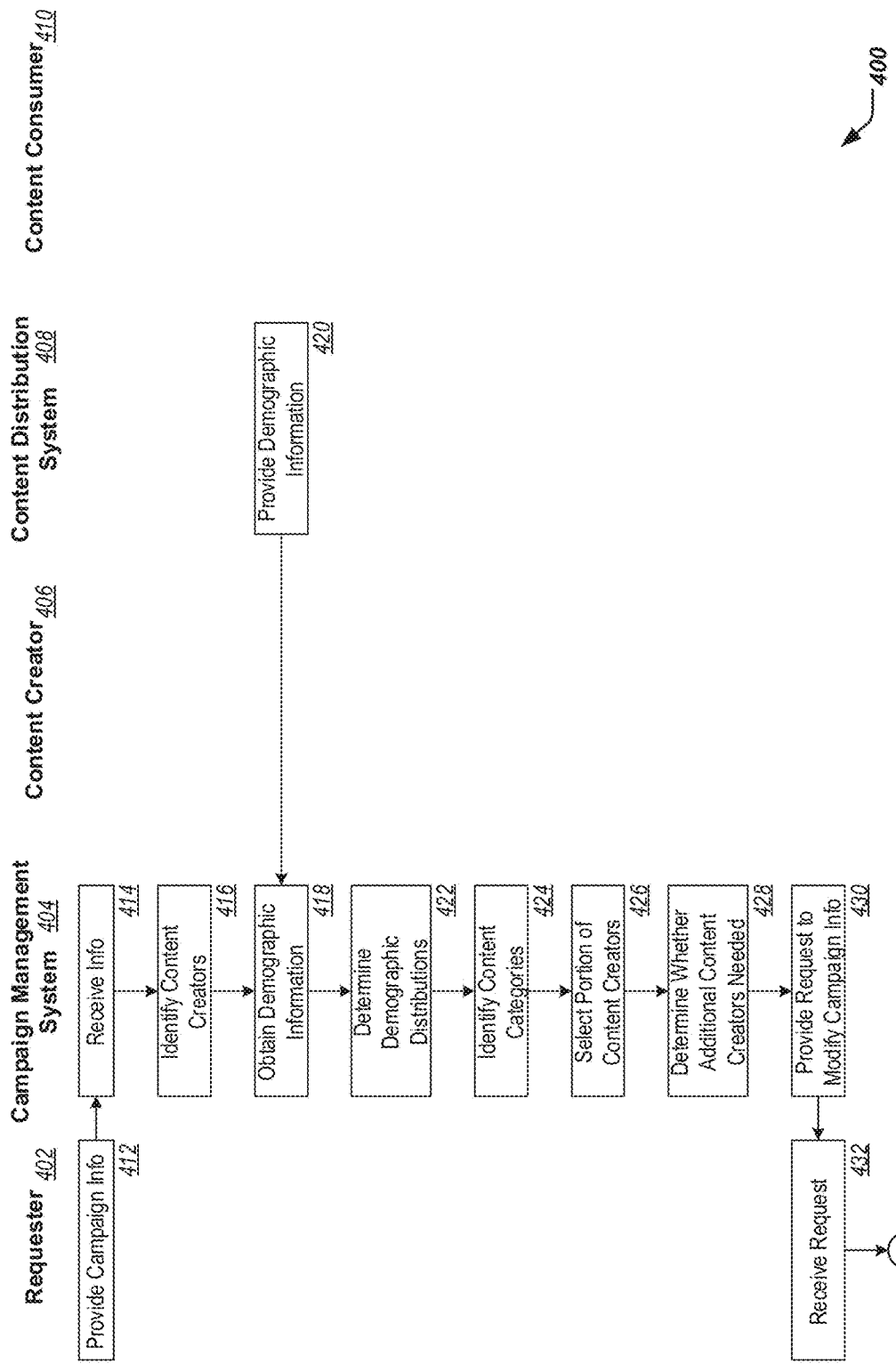
FIGS. 4A-D are flowcharts of an example technique for facilitating the creation and distribution of user-generated media content that conveys particular information and/or particular messages.
Figure 4B:
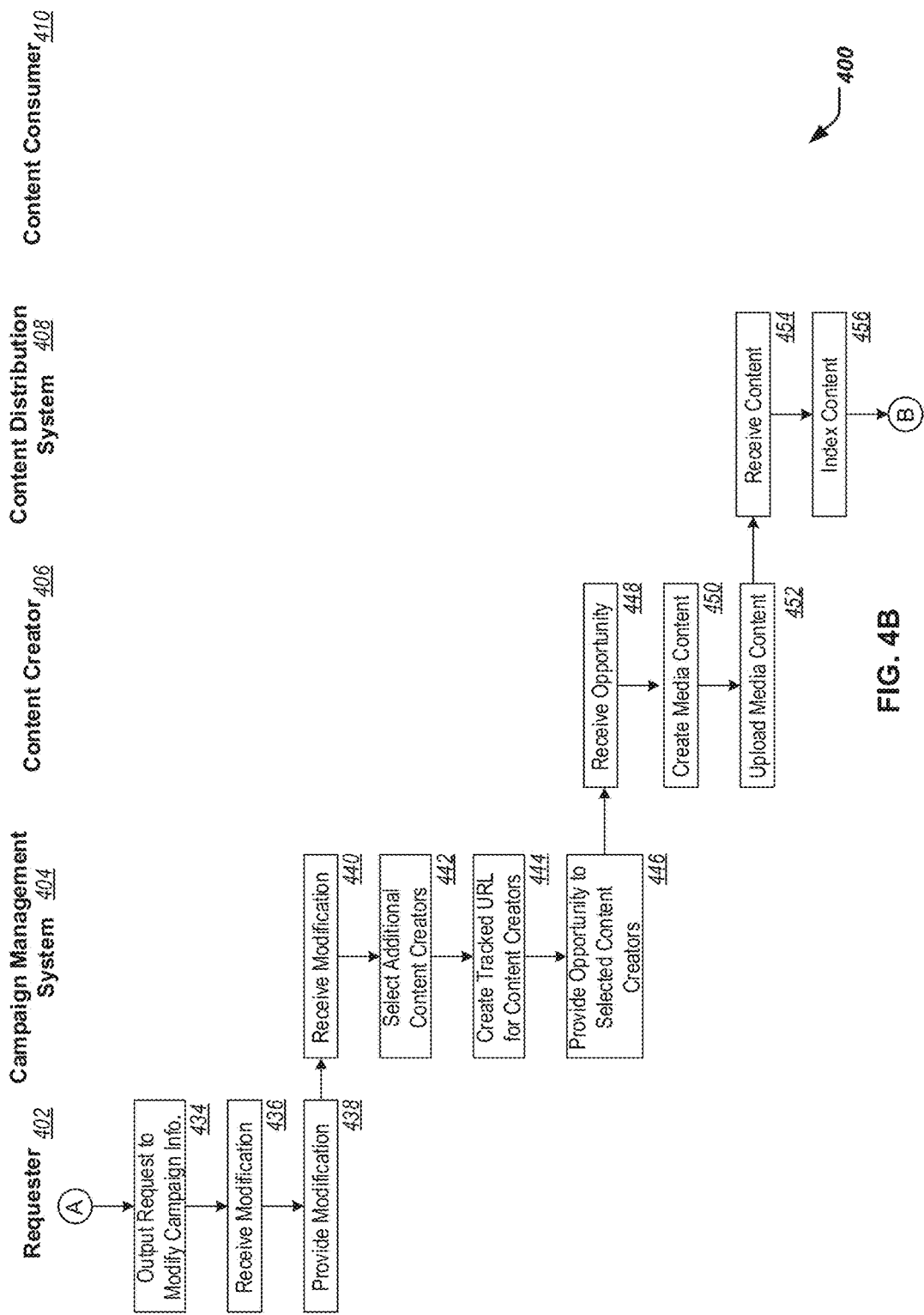

Referring to FIG. 4A, the requester system 402 (e.g., advertiser computer system, user computer system) can provide campaign information (412) that is received by the campaign management system 404 (414). For example, the requester system 204 provides the campaign information 208 to the campaign management system 202. The campaign management system 404 can identify content creators that are available to generate content for the campaign (e.g., promotional campaign) (416). For example, the campaign management system 404 can identify content creators who have been preselected based on their user-generated content receiving at least a threshold number of views and/or levels of engagement by other users.

The campaign management system 404 can obtain demographic information for users who have viewed and/or had at least a threshold level of engagement with content that was generated by the content creators (418) that is collected by and provided from the content distribution system 408 (420). The campaign management system 404 can determine demographic distributions across one or more demographic categories based on the demographic information (422). For example, the campaign management system 202 can determine the example demographic distributions depicted in the table 218 based on demographic information. The campaign management system 404 can identify one or more content categories to which the campaign pertains (424). For example, the campaign management system 202 can identify music as a content category from the information 208 for the example campaign described with regard to FIGS. 2A-B. A portion of the identified users can be selected based, at least in part, on the determined demographic distributions and/or the identified content categories (426). For example, at step C (224) the campaign management system 202 selects users based on the campaign request, viewer demographics, and/or content creator information.

The campaign management system 404 can determine whether additional content creators are needed for the campaign based on a number of content creators that have been selected (428). For example, if an insufficient number of content creators (less than a threshold number) have been selected, the campaign management system 404 may circle back with the requester 402 to broaden the scope of the campaign so that additional content creators may qualify to provide media content for the campaign. When additional content creators are determined to be needed, a request to modify the campaign information can be provided (430) to the requester system 402, which can receive the request (432) and, referring to FIG. 4B, output a request on the requester system to modify the campaign information (434). The requester computer system 402 can receive such a modification from a user of the system 402 (436) and can provide information regarding the modification (438) to the campaign management system 404. For example, a user of the requester system 402 may be asked to remove and/or loosen one or more of the requirements for the campaign and/or content creators. The campaign management system 404 can receive the modification information (440) and, based on the modification information, can selection one or more additional content creators (442).

The campaign management system 404 can create a unique tracked URL for each of the selected content creators corresponding to a campaign URL for one or more resources related to the campaign (444). For example, the redirection module 316 of the system 302 can generate tracked URLs for campaign URLs that are provided as part of the campaign. Opportunities to participate in the campaign can be provide to the selected content creators (446). For example, the system 202 can provide opportunities to participate in the new campaign from the requester system 204, as indicated by step D (226).

The content creator 406 can receive the opportunity (448) and, based on the opportunity, can proceed to create media content that includes the media content (e.g., videos, images, music) that includes information specified in the campaign (450). For example, the media content creators 104 create media content based on the campaign information in step D (118). The content creator 406 can upload the media content to the content distribution system 408 (452). For example, the media content creators 104 can upload the created media content 122 which includes the campaign information 124, as indicated by step E (120).

Figure 4C:
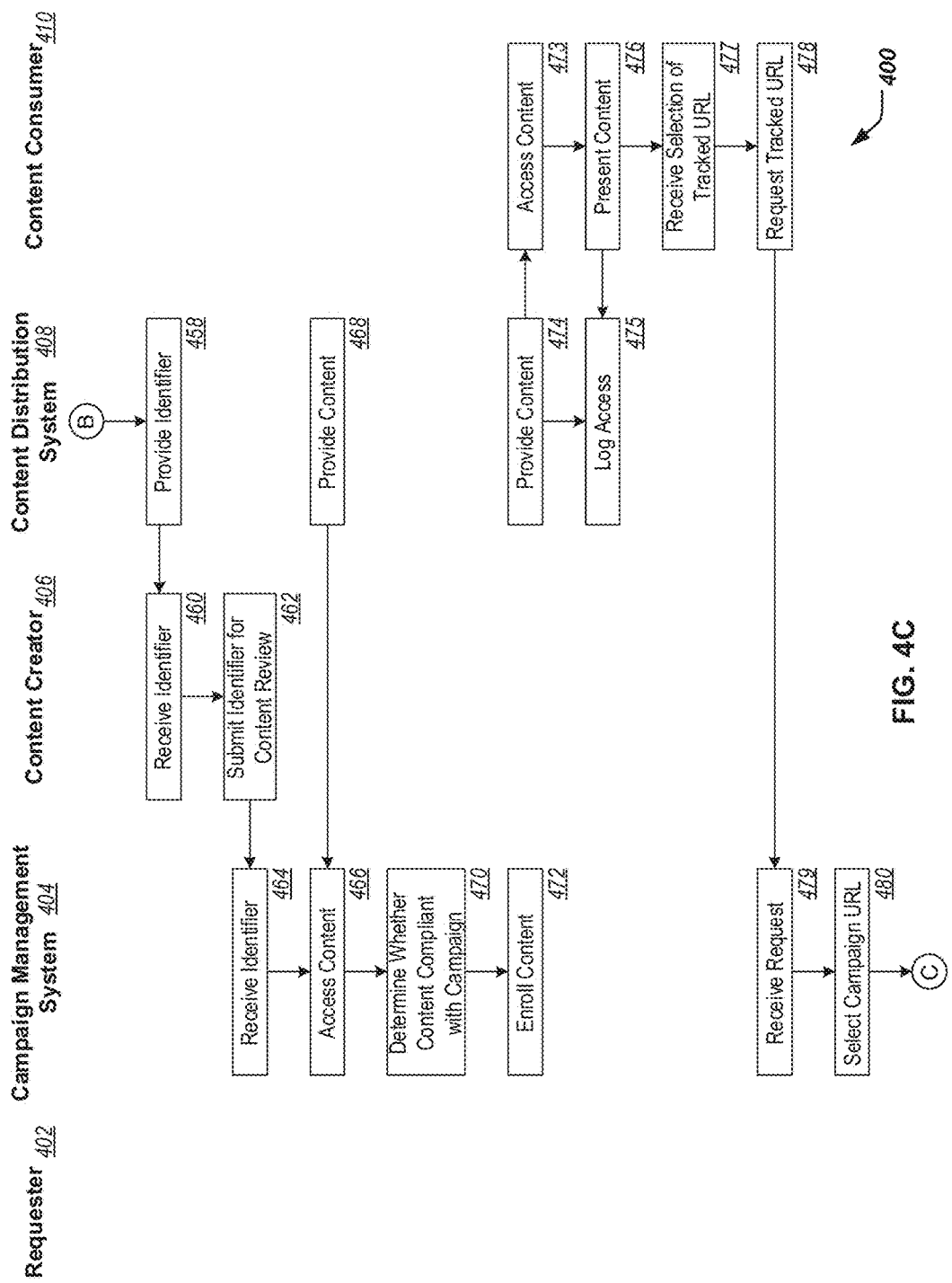
Figure 4D:
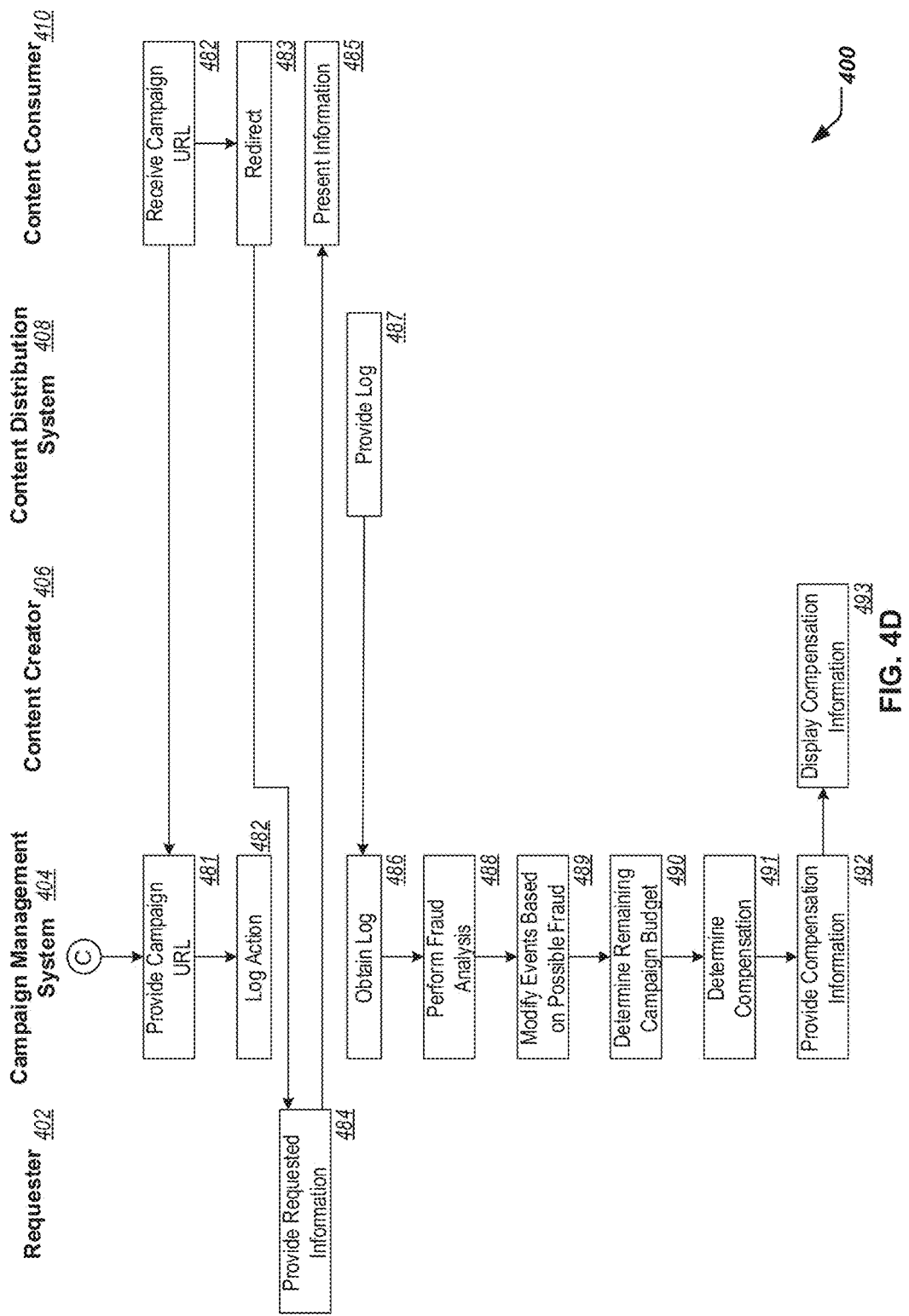

The content distribution system 408 can receive the media content (454), index the content so that the media content can be readily requested and located (456), and, referring to FIG. 4C, can provide an identifier to the content creator 408 for the media content on the local system of the content distribution system 408 (458). For example, the content distribution system 408 can provide the content creator 406 with a unique URL through which the media content can be accessed from the content distribution system 408. The content creator 406 can receive the identifier (460) and can provide the identifier to the campaign management system 404 for review as part of the campaign (462). For example, the computing devices 228 and 230 submit the media content for inclusion in the campaign in step F (236) and the submission can include the media content itself or a link to the media content on the media content distribution system 232. The media content management system 404 can receive the identifier (464), access the media content (466) from the content distribution system 408 using the identifier (468), and can determine whether the content is compliant with one or more requirements for the campaign (470). For example, the media campaign management system 202 can determine whether the medial content satisfies campaign requirements in step G (238). If the campaign management system determines that the media content is compliant, then the campaign management system 404 can enroll the media content in the campaign and can provide compensation for the media content as part of the campaign (472).

The content consumer 410 can access the media content (473) from the content distribution system 408 (474), which the content distribution system 408 can log (475). For example, the media content distribution system 232 an serve the media content (video C and video D) to the client consumers 244 at step H (240) and can log such accessing of and/or engagement with the media content in the access log 246. Such accessing of the media by the content consumer 410 can be in response to a request for the media content or for other content from the content consumer 410. For example, the content consumer 410 may request other media content (not part of a campaign) and the media content (part of a campaign) can be provided by the content distribution system 408 in association with the requested, other media content. For instance, the media content (part of a campaign) can be provided and presented as pre-roll content (e.g., pre-roll video) before the requested content is presented by the content consumer 410. Other associative presentations are also possible, such as presenting the media content during or after the presentation of the other, requested content. Providing the media content (part of a campaign) with other non-campaign content can be based on any of a variety of appropriate associations, such as the media content and the other, non-campaign content being distributed as part of the same or related channels on the content distribution system 408.

The content consumer 410 can present the content (e.g., display the content on a display of the content consumer computing device, audibly play the content through one or more speakers of the content consumer computing device) (476), which can include presentation of the tracked URL. The content consumer 410 can receive input that indicates one or more levels of engagement with the content. For example, the content consumer 410 can receive input such as selection of like and/or dislike features, selection of a feature to cause the content to be shared and/or reposted on one or more social networks, designation of one or more comments associated with the content, duration of time during which the content is viewed, and/or actions that cause viewing of the content to be aborted before the content has been presented in its entirety (e.g., stopping play of a video, providing input to skip a video, providing input to browse to other content). Input indicating the one or more levels of engagement with the content can be provided by the content consumer 410 to the content distribution system 408 and included as part of the access log (475).

The content consumer can receive user input that indicates a selection of the tracked URL (477) and can provide a request for the tracked URL, which can correspond to a location on the campaign management system 404, to the campaign management system 404 (478). For example, selection of the tracked URL 130 can cause the media consumers 110 to provide a request for information related to the campaign (step H—134) to the campaign management system 102. The campaign management system 404 can receive the request based on selection of the tracked URL (479), can select a corresponding campaign URL that corresponds to a resource for the campaign, such as a resource on the requester computer system 402 (480), can provide the campaign URL to the content consumer 410 (481), and can log the action (e.g., selection of the target URL, request for information related to the promotional campaign) (482). For example, the campaign management system 102 can provide the campaign URL 132 to the media consumers 110 and can log information associated with the interaction with the media consumers 110. The content consumer 410 can receive the campaign URL (482) and can be automatically redirected to the campaign URL (483), which can cause information related to the campaign to be requested from and provided by the requester 402 to the content consumer 410 (484), and the information to be presented on the content consumer computing device 410 (485). For example, the media consumers 110 can be redirected to requesting information related to the campaign from the requester 106, as indicated by step H (134).

The campaign management system 404 can obtain log information regarding media content accesses (486) from the content distribution system 408 (487). For example, the media campaign management system 202 can be provided with access information from the access log 246, as indicated by step I (250). The campaign management system 404 can perform fraud analysis of the access information and/or the logged actions performed by the content consumer 410 (488) and, based on the results of the fraud analysis, can modify events (logged media content accesses and related actions) for which compensation can provided to the content creator 406 (489). For example, the media campaign management system 202 can determine whether the access information is based on fraud, as indicated by step J (252), and when a high likelihood of fraud is detected can proceed to eliminate some or all of the events from qualifying for compensation. The campaign management system 404 can determine a current amount of the campaign budget that is remaining (490), based on the available budget, can determine compensation to be provided to the content creator 406 (491), and can provide the compensation information to the content creator 406 (492). For example, the media campaign management system 202 can determine and provide compensation to the content creators C and D as part of the campaign for the requester system 204. The content creator 406 may receive and display the compensation information (493).

In some implementations, the campaign management system 404 can provide additional information related to the campaign to the content creator 406 in association with the compensation information (493), such as information identifying content that was generated by other campaign creators for the campaign and the performance of these other campaign creators as part of the campaign. For example, the content creator 406 can access information (e.g., through a website provided by the campaign management system 404, through an electronic message (e.g., email, text message)) that identifies participants in the campaign, the content that was generated by the participants (e.g., links to the generated content as hosted by the content distribution system 408), the performance of such content according to one or more metrics (e.g., content views, levels of user engagement with the content) that are used to distribute portions of the budget for the campaign, and the participants' relative share of the budget allocated for the campaign (e.g., percentage of the budget awarded to each participant, money awarded to each participant). Such performance information can provide a variety of advantages, such as allowing content creators to learn from and more directly compete their peers, which can ultimately create better and more effective content and campaigns (e.g., promotional campaigns).

FIGS. 5A-D depict screenshots 500, 530, and 570 of an example user interface through which campaigns (e.g., promotional campaigns) can be created and managed. The example screenshots 500, 530, and 570 may be generated by any of a variety of appropriate computing devices, such as the campaign management systems 102, 202, 302, and/or 404, and may be provided for display on any of a variety of appropriate computing devices, such as the requester computer systems 106, 204, 336, and/or 402, or other computing devices (e.g., the user computing devices 332). The screenshots 500, 530, and 570 may be presented in any of a variety of appropriate user interfaces, such as a user interface provided through a web browser application that renders web pages and/or a user interface that is provided by a dedicated/stand-alone application (e.g., a native mobile application).

Figure 5A:
FIGS. 5A-D depict screenshots of an example user interface through which campaigns can be created and managed.

Referring to FIG. 5A, the example screenshot 500 of an interface that provides an overview of campaigns 502 that have been created for an entity (e.g., organization, company, individual user, group) and that provides an input control 504 through which a new campaign can be created. The information for each of the campaigns includes information that identifies a title for the campaign, a date range over which the campaign is running, a remaining budget for the campaign, an indication of the status of the campaign (e.g., active, complete, pending), and an indication of a type of campaign (e.g., cost per view (CPV), fixed costs (FC)). For example, the first campaign 504 has a title "Give Felicia Day's Geek and Sundry channel some featured channel love," it runs from Dec. 10, 2012 to Dec. 31, 2012, has a remaining budget of $2,500.00, and is currently active (e.g., the budget has not yet been exhausted, the time period for the campaign has not yet expired). In contrast, the sixth campaign 506 indicates that the campaign entitled "Fellow Fullscreener with a Great Cooking Show" has already completed, indicating that a budget for the campaign may have already been exhausted through users viewing media content that is part of the campaign, which is indicated as having a cost per view structure. In another example, the last campaign 508 is indicated as having a "pending" status, which can indicate that the campaign is currently soliciting and reviewing user-generate media content for the campaign and that the period during which compensation may be obtained for users accessing the user-generated media content has not yet started. A campaign may move through various periods: a campaign creation period during which the details for the campaign are hashed out, a briefing period during which content creators are provided with opportunities to participate in the campaign and during which the content creators generate media content for the campaign, an active period during which users view the user-generated media content for the campaign, and an ending period after the campaign has ended (e.g., budget exhausted, time period has expired) and compensation for the media content creators is provided.

Figure 5B:
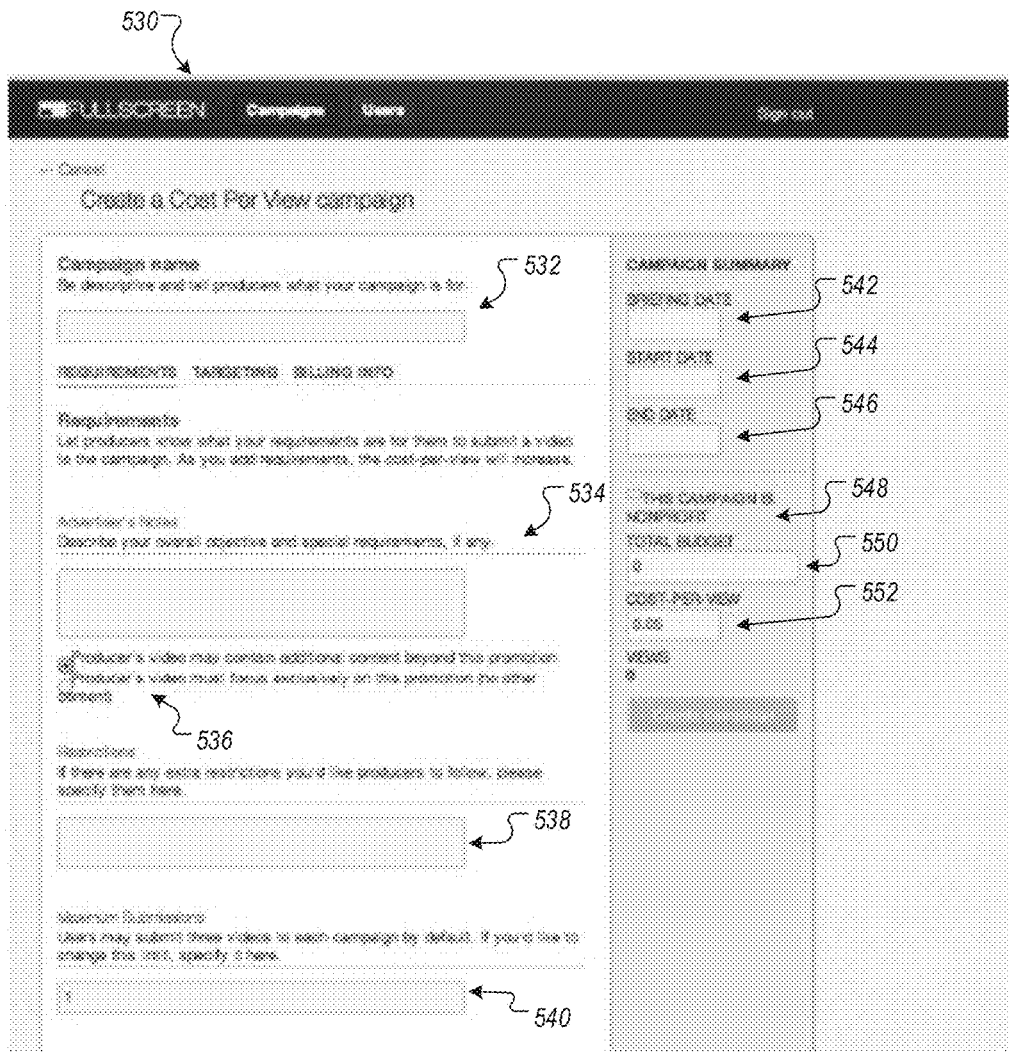
Figure 5C:
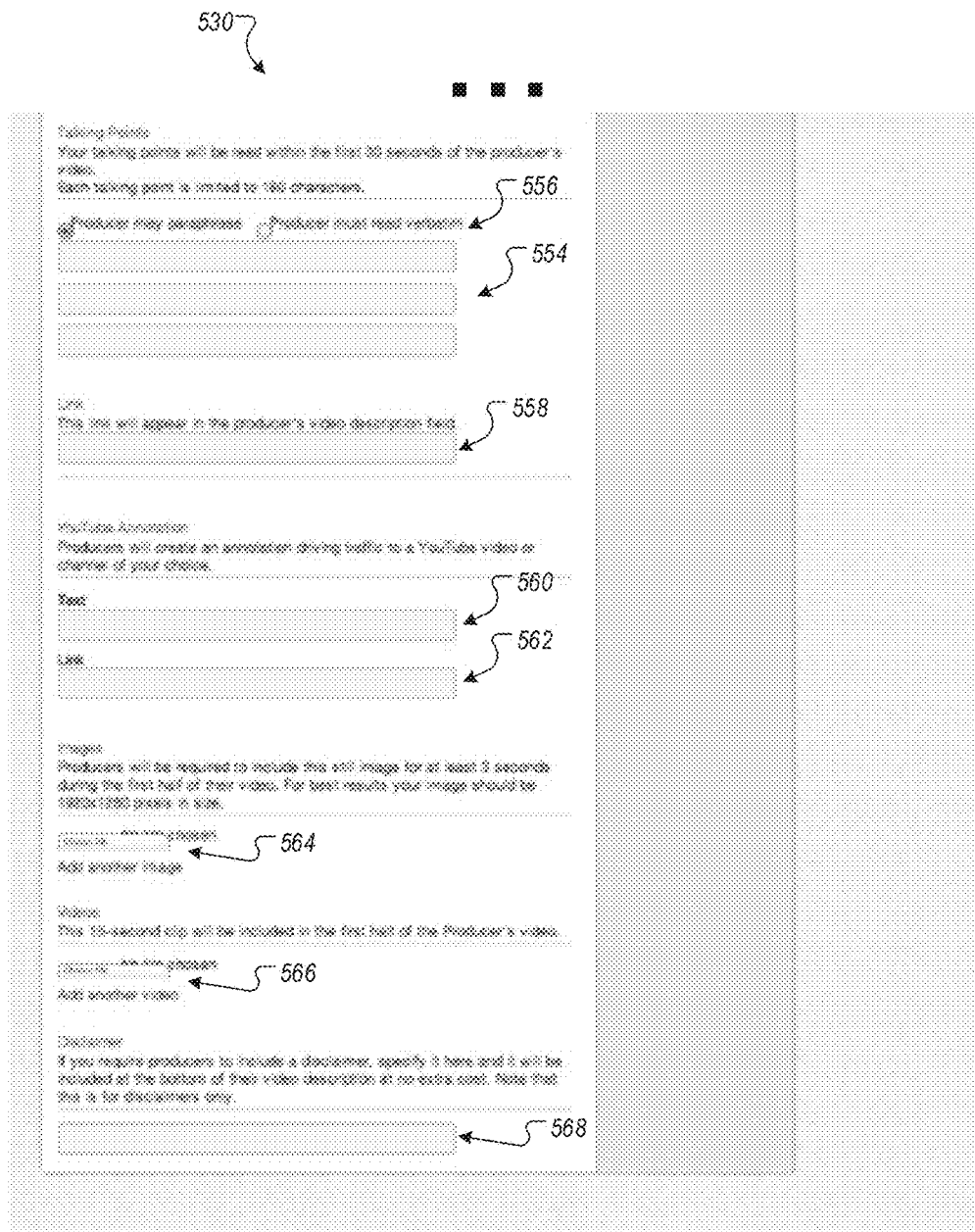

Referring to FIGS. 5B-C, the example screenshot 530, which is spread across FIGS. 5B-C, provides an interface through which details for a campaign can be entered. Referring to FIG. 5B, a name for the campaign can be entered in a first field 532, an information that is required to be included in the user-generated media content for the user-generated media content to participate in the campaign can be entered in a second field 534, an indication of whether the user-generated media content needs to be restricted to the subject matter of the campaign or can include content that is beyond the campaign can be provided through radio buttons 536, additional restrictions for the campaign can be specified in a third field 538, and a maximum number of submissions per content creator can be specified in a third field 540. Additionally, time periods for the campaign can be specified through fields 542-546, which can be used to identify a briefing period for the campaign during which content creators are informed of and generate media content for the campaign, and can be used to define an active period for the campaign during which views of the user-generated media content are logged and compensated. The campaign can be designated as being non-profit through the selectable input field 548, and budget information for the campaign, including a total budget and a cost per action (e.g., cost per view, cost per action), can be designated through fields 550 and 552.

Referring to FIG. 5C, talking points (example campaign information) that are to be included within user-generated media content as part of the campaign can be designated through the text fields 554. In the depicted example, a campaign creator can designate up to three talking points that are to be presented within the first 30 seconds of a content creator's (content producer's) video. The radio buttons 556 can be used to designate whether the content creator (producer) may paraphrase the talking points or whether the content creator needs to reproduce them verbatim. A link that is to appear in an associated description for a video (e.g., a campaign URL) can be designated in the link field 558. Annotations to the user-generated media content that will be overlaid the video at one or more times while it is playing on a user computing device can be specified through fields 560 and 562. Text that will be displayed as the annotation can be entered in the field 560 and a link that corresponds to the annotation can be specified in the field 562. For instance, the text for the annotation could be "click here to find out more about this product" and selection of the annotation by a user can cause the link specified in the field 562 to be selected and for content identified by the link to be retrieved for display on the client computing device.

Images and videos can also be identified for inclusion in user-generated media content for a campaign. For instance, an image to be included in the user-generated media content can be selected through the image file selection control 564 and a video, which may be limited in length (e.g., 15 seconds), to be included in the user-generated media content can be selected through the video file selection control 566. A disclaimer may also be identified through field 568 for inclusion in a description associated with user-generated media content. For media content to qualify for participation in and compensation related to a media campaign, it may have to include the various features and information identified through by the requester in the fields depicted in FIGS. 5B-C.

Figure 5D:
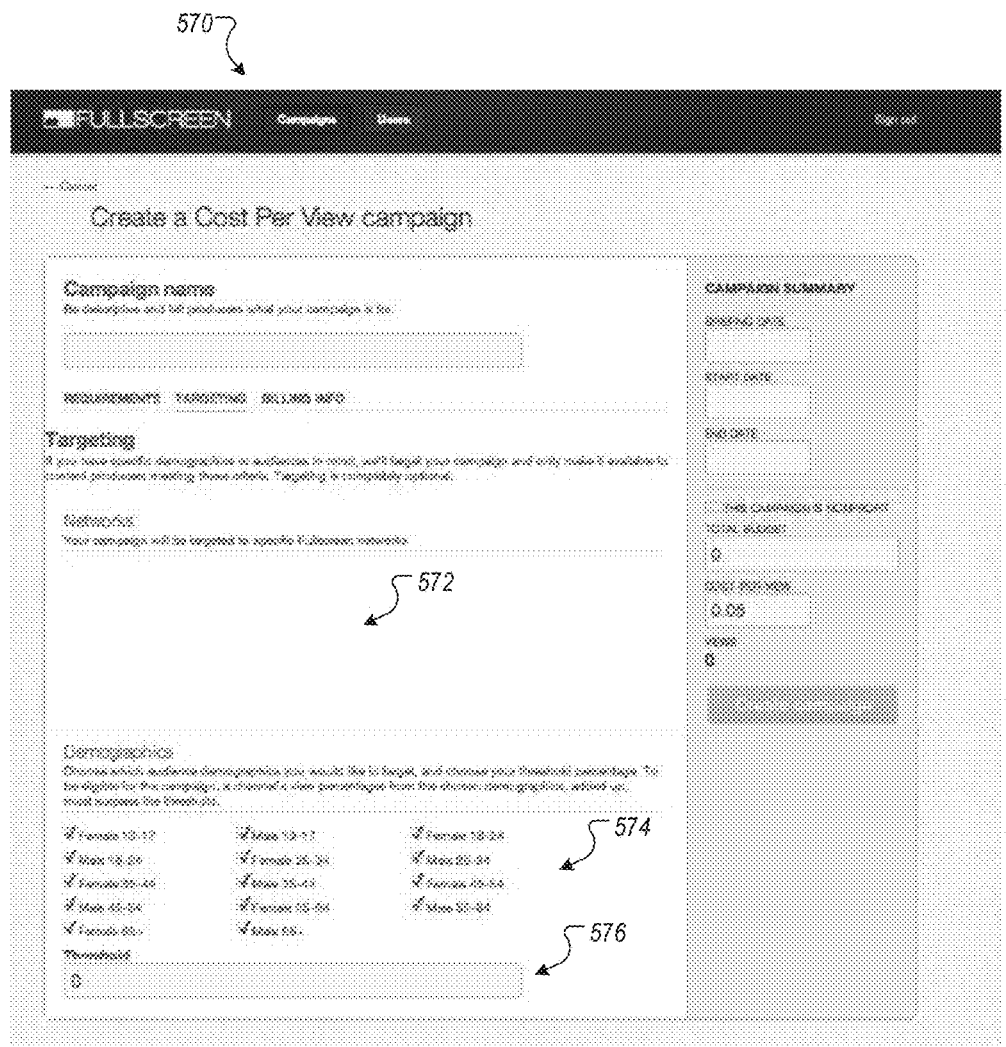

Referring to FIG. 5D, the screenshot 570 depicts a user interface through which a target audience for the campaign can be identified. In a first area 572, one or more networks of users can be identified as a target audience for the campaign. The networks of users may pertain to networks of acquaintances (e.g., social networks) and/or can be based on other information, such as common user interests. Demographics of a target audience for a campaign can be identified by the checkboxes 574, which identify various demographic categories related to gender and age. Other demographic categories can also be included, such as geographic location, education level, profession, family status (e.g., single, married, no children, 2+ children), language(s) spoken, and/or other demographic information. Demographics that are targeted for a campaign can be tuples of demographic categories and can be selected as such through the user interface depicted in FIG. 5D. For example, if a requester (e.g., advertisers) wants to target the demographic "Male 18-34," the requester can select the "Male 18-24" demographic as well as the "Male 25-34" demographic, as opposed to generally targeting a gender and a range of ages discretely. A minimum threshold amount (e.g., ratio, percentage, quantity) of a content creator's audience who fall into the selected demographic categories can be identified in the field 576. The threshold amount can apply to demographics composed of tuples of demographic categories that are selected by requesters. For example, if the requester is targeting the demographic "Male 18-34" which is made up of the tuple including "Male 18-24" and "Male 25-34," the identified threshold in the field 576 can apply to the demographic "Male 18-34" as a whole. Other fields may also be provide in the interface, such as fields that allow a user to specify a content category for the campaign which, as described above, may be used to identify content creators based on their audience and/or the media content that has been generated by the content creators.

The interfaces depicted in FIGS. 5A-D may be used outside of the context of campaigns and can be adapted to facilitate and manage requests for the creation and distribution of user-generated media content that conveys particular information and/or particular messages, as discussed above with regard to FIGS. 1-4.

Figure 6:
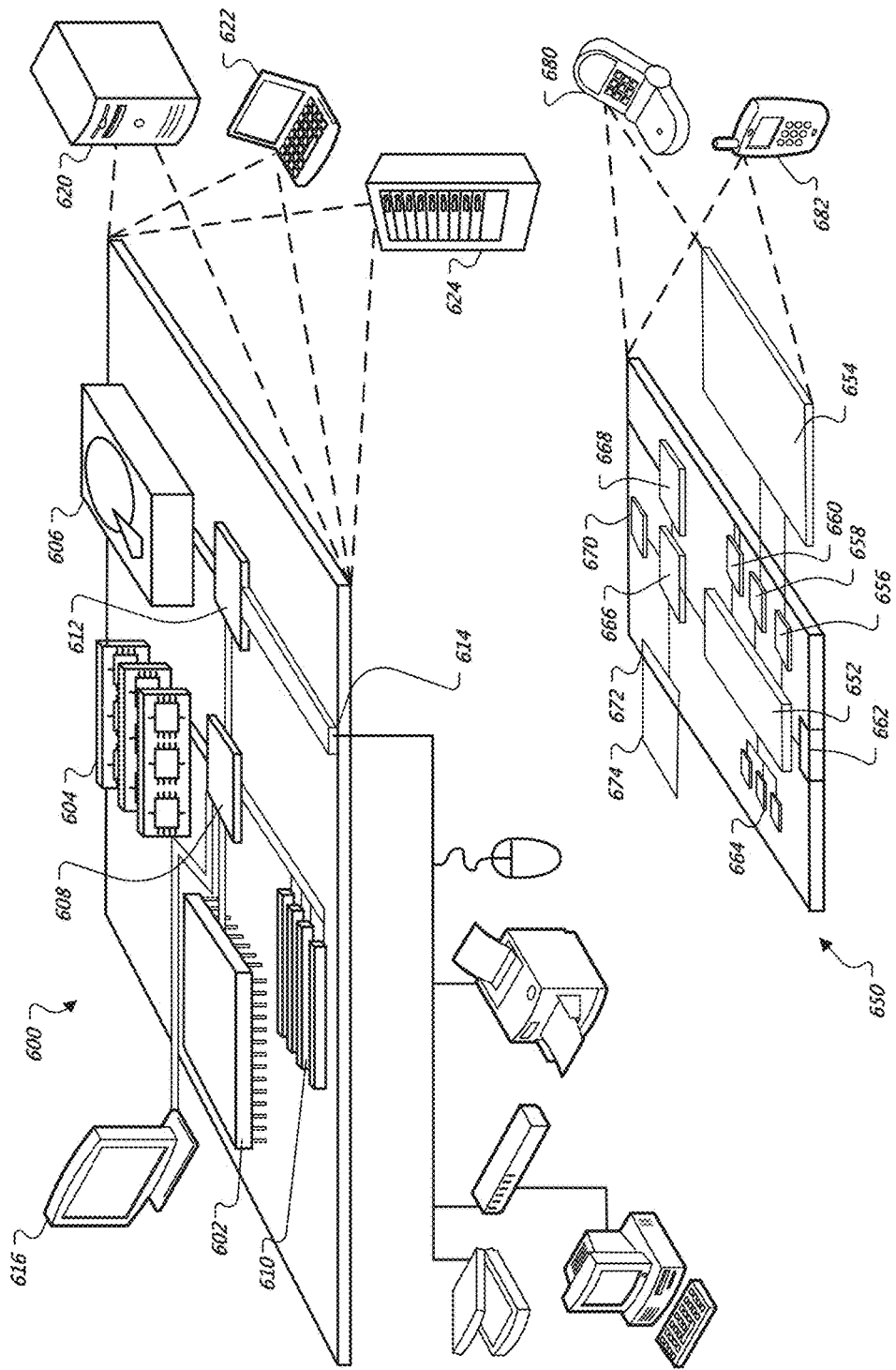
FIG. 6 shows an example of a computer device and a mobile computer device that can be used to implement the techniques described herein.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 652 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Figure 7:
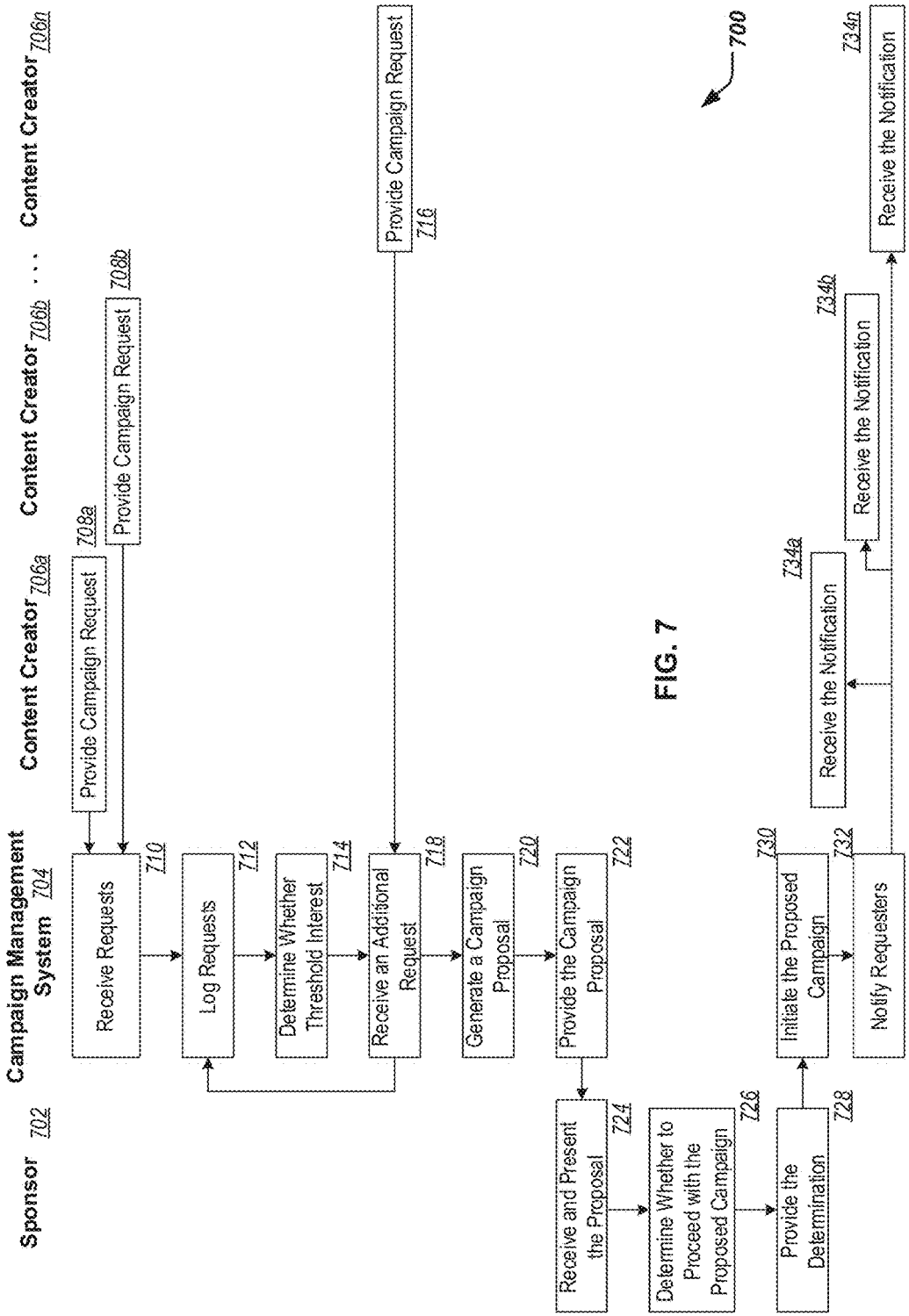
FIG. 7 is a flowchart of an example technique 700 for content creator-based initiation of compensation for user-generated media content that conveys particular information and/or particular messages.

FIG. 7 is a flowchart of an example technique 700 for content creator-based initiation of compensation for user-generated media content that conveys particular information and/or particular messages, such as part of campaigns (e.g., promotional campaigns). Portions of the technique 700 are identified as being performed in part by a sponsor computer system 702 (e.g., the requester computer system 106, the requester system 204, the requester computer system 336, the requester 402), a campaign management computer system 704 (e.g., the campaign management system 102, the campaign management system 202, the campaign management computer system 302, campaign management computer system 404), and content creator computer systems 706*a-n* (e.g., the media content creators 104, the computing devices 228 and 230, the user computing devices 332, the content creator computer system 406). As described above with regard to the systems 100, 200, and 300 depicted in FIGS. 1-3, and with regard to the technique 400 depicted in FIGS. 4A-D, in addition to facilitating the creation campaigns (e.g., promotional campaigns) based on user-generated content that includes particular information and/or particular messages, such as promotional campaigns that include promotional information and/or promotional messages, the technique 700 can also facilitate establishing a compensation framework for user-generated media content that includes particular information and/or particular messages related to the sponsor 702 outside of the context of a campaign.

The campaign management system 704 can provide an interface through which the content creators 706*a-n* can express their interest in participating in generating media content for a yet to be initiated campaign (e.g., promotional campaign) for a particular entity, such as individuals, organizations, products, services, causes, and/or other appropriate entity around which a campaign could be centered. Such entities may not be aware that interested content creators are available to and interested in creating media content for a campaign related to the entities. The campaign management system 704 can facilitate the creation of such a campaign by collecting expressions of interest from the content creators 706*a-n* and, once a threshold level of interest has been attained, reaching out to the entity (e.g., sponsor 702) to see if the entity would like to proceed with the campaign based on the interest from the content creators 706*a-n*. The sponsor 702 can serve similar roles to the requester computer systems 106, 204, 336, and/or 402, but in the technique 700 the sponsor 702 may be solicited to participate in and provide compensation for user-generated media content (e.g., as part of a campaign) instead of requesting such a role.

In the depicted example, the content creators 706*a* and 706*b* provide campaign requests (708*a* and 708*b*) to the campaign management system 704, which receives the requests (710). Such campaign requests can be generated by the content creators 706*a-b* and received by the campaign management system 704 in any of a variety of appropriate ways, such as through the use of electronic forms (e.g., web-based forms, application-based forms) and/or messaging (e.g., text messages sent to a particular number, emails sent to a particular address and/or with a particular phrase, title, or code). The requests can include a variety of details, such as information identifying the entity to which the request is directed (e.g., individuals, organizations, products, services), the content creator's familiarity with the entity (e.g., current use of a product or service), a proposed focus for the campaign (e.g., theme for the campaign), ideas for content that the content creator would likely create for the campaign (e.g., video testimonial explaining the benefits of the product/service), and/or a compensation structure that the content creators would find appealing for the campaign (e.g., minimum amount of money per view and/or threshold level of engagement with the content). Once a request has been submitted to the campaign management system 704, it may be visible to other content creators who can view details regarding the request (e.g., identity of entity that is the focus of the proposal, suggested compensation levels) and can add their support to the request to build toward the threshold level of interest for the campaign.

For example, the content creators 706*a* and 706*b* may both own and be enthusiastic about a particular brand of shoe that they recently purchased, and would be interested in creating media content for the brand of shoe. The content creators 706*a-b* can check the campaigns that have been offered to them by the campaign management system 704 and, not seeing a current campaign for the brand of shoe, can provide campaign requests 708*a-b* to the campaign management system 704 with details regarding their proposal (e.g., background on their interest in the shoe brand, type of content they would create, suggested compensation for the campaign). In implementations where a media campaign already exists for the brand of shoe but, for one or more reasons, was not offered to the content creators 706*a-b*, the campaign management system 704 can be programmed to automatically provide the offer participation in the campaign to the content creators 706*a-b* or to reach out to the sponsor 702 for prior approval before doing so.

The campaign management system 704 can log campaign requests (712) and determine whether a threshold level of interest has been reached (714). A level of interest in a campaign can be based on variety of factors, such as a number of requests and/or a level of influence of the content creators providing the requests. Influence can be determined in any of a variety of appropriate ways, such as a number of subscribers and/or followers for a content creator, a number of views, levels of engagement with content, and/or recent trends in subscribers/followers, views, and/or engagement. A threshold level of interest can vary based on a variety of appropriate factors, such as a type and size of entity to which the proposed campaign pertains, whether previous media content-based campaigns for the entity have been successful, and/or projected levels of participation from content creators based, at least in part, on a volume of other campaigns that the campaign management system 704 is currently running and managing.

In the example depicted in FIG. 7, the determined threshold is not reached based on the campaign requests 708*a-b* from the content creators 706*a-b*, and the campaign management system 704 receives (718) a third campaign request for the same entity provided by the content creator 706n (716). The campaign management system 704 can log the request from the content creator 706n (712) and can again determine whether the threshold level of interest has been reached for the proposed campaign (714). In this example, the campaign request from the content creator 706n pushes the level of interest over the threshold level, causing the campaign management system 704 to contact the sponsor 702 (entity to which the campaign requests from the content creators 706a-n pertain) regarding the proposed campaign. The campaign management system 704 can do this by generating an aggregate campaign proposal (720) from the different proposals that are provided by the content creators 706a-n and providing the generated proposal to the sponsor 702 (722). The generated campaign proposal can synthesize, as best possible, the different proposals highlighting areas of consensus among the content creators 706a-n and also areas where the proposals diverge.

The sponsor 702 (e.g., advertiser) can receive and present the campaign proposal from the campaign management system 704 (724) and can, either with or without user input, be programmed to determine whether to proceed with the proposed campaign (726). For example, the sponsor 702 may be programmed to use one or more rules and/or other sources of information (e.g., current campaign budgets, target content views) to determine whether to proceed a campaign proposal. The sponsor 702 may additionally be programmed to generate and provide counter proposals to the campaign management system 704. The sponsor 702 can provide the determination to the campaign management system 704 (728), which can initiate the proposed campaign based on the determination (730). The campaign management system 704 can initiate the campaign in the same or similar manner as described above with regard to the campaign management system 404 in the technique 400.

The campaign management system 704 can additionally provide notifications to the content creators 706a-n who requested the campaign (732), which can be received by the campaign creators 706a-n (734a-n). The campaign management system 704 may select the content creators 706a-n who requested the campaign to be provided with offers to participate in the campaign and may additionally identify other content creators to whom offers to participate should be provided. The technique 700 can be performed alone or in combination with other techniques, such as the technique 400 described above with regard to FIGS. 4A-D.

In some implementations, the requester/sponsor computer system (e.g., the requester computer system 106, the requester system 204, the requester computer system 336, the requester 402, the sponsor computer system 702) can be a content creator computer system (e.g., the media content creators 104, the computing devices 228 and 230, the user computing devices 332, the content creator computer system 406, the content creator computer systems 706a-n). For example, a content creator can initiate a campaign through the campaign management system 704 for the creation of media content by other content creators. For instance, a content creator can initiate a promotional campaign to promote, for example, the content creator, the content creator's media content, and/or the content creator's channel(s) through media content generated by other content creators, such as more influential, popular, and well-known content creators. Compensation may be provided by such a content creator to these other content creators, such as through the transfer of money, credits, and/or other items of value (e.g., goods, services).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The invention claimed is:
1. A computer-implemented method comprising:
receiving, at a computer system, a request to solicit one or more users to generate media content for a campaign, the request including information that identifies i) one or more targeted parameters for an intended audience of the campaign, ii) a message from an advertiser that must be included in the media content participating in the campaign, and iii) a level of compensation per access of media content that is enrolled in the campaign;

receiving, at the computer system, historical media content access information for a group of content creating users from a media distribution system, wherein the historical media content access information for each content creating user identifies an average number of times that historical media content created by the content creating user was accessed by content consuming users;

identifying, by the computer system from among the group of content creating users, a plurality of content creating users who each have historical media content that has been accessed, on average, at least a minimum number of times based on the media content access information, wherein the identifying is performed by comparing the average number of times that the historical medial content for each content creating user was accessed with the minimum number of times;

obtaining, from the media distribution system, demographic data for a plurality of content consuming users who have accessed the media content that was generated by the plurality of content creating users, wherein the plurality of content creating users are different from the plurality of content consuming users, wherein the demographic data obtained per each of the plurality of content creating users;

determining, based the demographic data and the plurality of content creating users, distributions of the plurality of content consuming users for each of the plurality of content creating users across a plurality of demographic categories, wherein each of the distributions i) corresponds to one of the plurality of content creating users and ii) comprises a distribution, across the plurality of demographic categories, of a portion of the plurality of content consuming users who accessed media content that was generated by the one of the plurality of content creating users;

selecting, by the computer system, a portion of the plurality of content creating users based on a comparison of i) the one or more targeted parameters for the campaign and ii) values in the distributions of the plurality of content consuming users for each of the plurality of content creating users across the plurality of demographic categories, wherein the selected portion of the plurality of content creating users comprises less than all of the plurality of content creating users, wherein the selected portion of the plurality of content creating users have values in the distributions that are greater than threshold values in the targeted parameters;

providing, by the computer system and to one or more computing devices that are associated with the selected portion of the plurality of content creating users, information that identifies an opportunity to generate media content for the campaign and the message;

after providing the information to the one or more computing devices, receiving a link that allows access to online distributed user-generated media content that was generated for the campaign by at least one content creating user from the selected portion of content creators;

accessing the link and determining that the online distributed user-generated media content includes the message;

enrolling, based on the determination that the online distributed user-generated media content includes the message, the online distributed user-generated media content in the campaign;

identifying a number of times that the online distributed user-generated media content has been accessed online by content consuming users via an online media distribution system hosting the online distributed user-generated media content;

accessing, from the online media distribution system, the historical media content access information for other media content previously generated by the at least one user and distributed online by the online media distribution system to content consuming users, wherein the other media content is not part of the campaign, the historical media content access information for the at least one user identifying an average number of accesses of the other media content online from the online media distribution system by content consuming users;

determining, using the historical media content access information for the at least one user, whether the number of times that the online distributed user-generated media content has been accessed from the online media distribution deviates, by an amount 25% or greater, from the average number of accesses for the other media content for the at least one user on the online media distribution system;

identifying that there is a likelihood of fraud for the number of times that the online distributed user-generated media content has been accessed from the online media distribution system in response to determining that the number of times deviates by an amount 25% or greater from the average number of accesses for the other media content for the at least one user;

providing, in response to identifying the likelihood of fraud, an alert indicating that fraud has been detected;

determining an amount of compensation for the online distributed user-generated media content based on i) the level of compensation per access, ii) the number of times that the online distributed user-generated media content has been accessed, and iii) the detected fraud; and providing, by the computer system, information that identifies the determined amount of compensation for the online distributed user-generated media content.

2. The computer-implemented method of claim 1, wherein:

the one or more targeted parameters for the campaign comprise i) information that identifies one or more particular demographic categories for a target audience of the campaign and ii) a minimum level of users within the one or more particular demographic categories; and the comparison comprises determining whether the values in the distributions satisfy the minimum level of users for the one or more particular demographic categories that are identified by the one or more targeted parameters.

3. The computer-implemented method of claim 1, wherein the online distributed user-generated media content comprises a video and accessing the online distributed user-generated media content comprises viewing the video.

4. The computer-implemented method of claim 1, wherein the number of times that the online distributed user-generated media content has been accessed is based on a number of unique users, a number of unique computing devices, or a combination thereof that have accessed the online distributed user-generated media content.

5. The computer-implemented method of claim 1, wherein the request for the campaign further identifies a level of compensation per action performed by users accessing media content that is enrolled in the campaign;
the method further comprising:
identifying a number of times that users have performed the action in association with accessing the online distributed user-generated media content;
determining an amount of compensation for the online distributed user-generated media content based on i) the level of compensation per action and ii) the number of times that the action has been performed in association with accessing the online distributed user-generated media content; and
providing, by the computer system, information that identifies the determined amount of compensation for the online distributed user-generated media content.

6. The computer-implemented method of claim 5, wherein the action comprises selection of a link that is presented with the online distributed user-generated media content.

7. The computer-implemented method of claim 6, wherein the request further identifies a remote URL for a landing page for the campaign;
the method further comprising:
generating, by the computer system and for a particular content creating user from the selected portion of the content creating, the link, wherein the link comprises a local URL that is local to the computer system; and
storing redirection information that correlates i) the local URL, ii) the remote URL, iii) a particular content creating user from the selected portion of the content creating for whom the link is generate, and iv) the campaign;
wherein the link is provided to a particular computing device from the one or more computing devices in association with an opportunity to generate media content for the campaign.

8. The computer-implemented method of claim 7, further comprising:
receiving, at the computer system, a request for the local URL;
storing information that credits the particular content creating user with an instance of the action having been performed in association with the campaign; and
in response to receiving the request, returning a redirect instruction with the local URL.

9. The computer-implemented method of claim 1, wherein the determination of whether the online distributed user-generated media content includes the message is based on text that is associated with the online distributed user-generated media content.

10. The computer-implemented method of claim 1, wherein the determination of whether the online distributed user-generated media content includes the message is based on feedback from a human user who reviewed the online distributed user-generated media content.

11. The computer-implemented method of claim 1, wherein the request is received from another computer system that is associated with an advertiser;
the method further comprising:
determining whether to provide feedback to the advertiser based on a comparison of i) a number of users who are included in the portion of the plurality of content creating users and ii) a threshold number of users;
providing, based on the determination of whether to provide feedback and to the other computer system that is associated with the advertiser, information identifying the number of users;
receiving, from the other computer system, a modification to the one or more parameters; and
selecting, based on the modification to the one or more parameters, one or more additional content creating users, wherein the one or more additional content creating users are provided the information that identifies the opportunity to generate media content for the campaign.

12. The computer-implemented method of claim 1, further comprising:
receiving, from a client computing device that is associated with a
particular content creating user from the selected portion of the plurality of content creating users, a request for a web page that includes a reserved area that displays campaign opportunities;
wherein the information that identifies the opportunity to generate the media content for the campaign is provided to the client computing device as part of the requested web page, the opportunity being one of a plurality of opportunities that are displayed to the user in the web page.

13. The computer-implemented method of claim 1, further comprising:
identifying content categories that are associated with media content that has been generated by the plurality of content creating users;
wherein the one or more parameters further identify a particular content category that is associated with the campaign; and
wherein the selection of the portion of the plurality of content creating users is further based on the identified content categories and the particular content category that is associated with the campaign.

14. The computer-implemented method of claim 1, wherein the plurality of demographic categories are based on one or more of: age, gender, geographic location, and language.

15. The computer-implemented method of claim 1, wherein the online distributed user-generated media content comprises one or more of: videos, images, and music.

16. A computer system comprising:
one or more computing devices;
an interface that is programmed to receive a request to solicit one or more users to generate media content for a campaign, the request including information that identifies i) one or more targeted parameters for an intended audience of the campaign, ii) a message from an advertiser that must be included in the media content participating in the campaign, and iii) a level of compensation per access of media content that is enrolled in the campaign;
a campaign creation module that is programmed i) to receive historical media content access information for a group of content creating users from a media distribution system, the historical media content access information for each content creating user identifying an average number of times that historical media content created by the content creating user was accessed by content consuming users, and ii) to identify a plurality of content creating users from among the group of content creating users who each have historical media content that has been accessed, on average, at least a minimum number of times based on the media content access information, wherein the identifying is performed by comparing the average number of times that the historical medial content for each content creating user was accessed with the minimum number of times;

a demographic data repository that obtains, from the media distribution system, and stores demographic data for a plurality of content consuming users who have accessed the media content that was generated by the plurality of content creating users, wherein the plurality of content creating users are different from the plurality of content consuming users, wherein the demographic data obtained per each of the plurality of content creating users;

a demographic analyzer that is programmed to determining, based the demographic data and the plurality of content creating users, distributions of the plurality of content consuming users for each of the plurality of content creating users across a plurality of demographic categories, wherein each of the distributions i) corresponds to one of the plurality of content creating users and ii) comprises a distribution, across the plurality of demographic categories, of a portion of the plurality of content consuming users who accessed media content that was generated by the one of the plurality of content creating users;

a content creator selection module that is programmed to select a portion of the plurality of content creating users based on a comparison of i) the one or more targeted parameters for the campaign and ii) values in the distributions of the plurality of content consuming users for each of the plurality of content creating users across the plurality of demographic categories, wherein the selected portion of the plurality of content creating users comprises less than all of the plurality of content creating users, wherein the selected portion of the plurality of content creating users have values in the distributions that are greater than threshold values in the targeted parameters;

a front end that is programmed to provide, the computer system and to one or more computing devices that are associated with the selected portion of the plurality of content creating users, information that identifies an opportunity to generate media content for the campaign and the message;

a campaign content analyzer that is programmed to i) after providing the information to the one or more computing devices, receive a link that allows access to online distributed user-generated media content that was generated for the campaign by at least one content creating user from the selected portion of content creators, ii) access the link and determine that the online distributed user-generated media content includes the message, and iii) enroll, based on the determination of that the online distributed user-generated media content includes the message, the online distributed user-generated media content in the campaign;

event tracking module that is programmed to identify a number of times that the online distributed user-generated media content has been accessed online by content consuming users via an online media distribution system hosting the online distributed user-generated media content;

fraud detection unit that is programmed to i) access, from the online media distribution system, the historical media content access information for other media content previously generated by the at least one user and distributed online by the online media distribution system to content consuming users, wherein the other media content is not part of the campaign, the historical media content access information for the at least one user identifying an average number of accesses of the other media content online from the online media distribution system by content consuming users, ii) determine, using the historical media content access information for the at least one user, whether the number of times that the user-generated media content has been accessed from the online media distribution deviates, by an amount 25% or greater, from the average number of accesses for the other media content for the at least one user on the online media distribution system, iii) identify that there is a likelihood of fraud for the number of times that the online distributed user-generated media content has been accessed from the online media distribution system in response to determining that the number of times deviates by an amount 25% or greater from the average number of accesses for the other media content for the at least one user, and iv) provide, in response to identifying the likelihood of frame, an alert indicating that fraud has been detected; and a compensation determination unit that is programmed to i) determine an amount of compensation for the online distributed user-generated media content based on a) the level of compensation per access, b) the number of times that the online distributed user-generated media content has been accessed, and c) the detected fraud, and ii) provide information that identifies the determined amount of compensation for the online distributed user-generated media content.

17. A computer-implemented method comprising:

receiving, at a campaign management computer system and from a requester computing device, a request to solicit one or more users to generate media content for an online campaign, the request including information that identifies (i) one or more parameters for the online campaign, (ii) a message to be included in the media content for the online campaign, and (iii) a level of compensation per view of media content that is enrolled in the online campaign;

identifying, by the campaign management computer system, a plurality of content creating users on an online media distribution platform who have each generated media content that has been distributed over internet to at least a minimum number of users, the online media distribution platform being hosted by an online media distribution computer system;

obtaining, by the campaign management computer system, demographic data for a plurality of content consuming users on the online media distribution platform who have viewed the media content that was generated by the plurality of content creating users, wherein the plurality of content creating users are different from the plurality of content consuming users;

determining, by the campaign management computer system based on the demographic data and the plurality of content creating users, distributions of the plurality of content consuming users across a plurality of demographic categories, wherein each of the distributions (i) corresponds to one of the plurality of content creating users and (ii) comprises a distribution, across the plurality of demographic categories, of a portion of the plurality of content consuming users who viewed media content that was generated by the one of the plurality of content creating users;

selecting, by the campaign management computer system, a portion of the plurality of content creating users based on a comparison of (i) the one or more parameters for the online campaign and (ii) the distributions of the plurality of content consuming users across the plurality of demographic categories;

providing, by the campaign management computer system and to one or more computing devices that are associated with the selected portion of the plurality of content creating users, information that identifies (i) an opportunity to generate media content for the online campaign and (ii) the message for the online campaign;

receiving, by the campaign management computer system and from the one or more computing devices, a link to user-generated media content created for the online campaign by at least one content creating user from the selected portion of content creators, the user-generated media content being hosted on the online media distribution computer system and the link identifying the user-generated media content on the online media distribution computer system;

determining, by the campaign management computer system, whether the user-generated media content includes the message required for the online campaign;

enrolling, by the campaign management computer system and based on the determination of whether the user-generated media content includes the message, the user-generated media content in the online campaign, wherein enrollment of the user-generated media content in the online campaign causes distribution of the user-generated media content over the internet by the online media distribution platform to be compensated on a per view basis, subject to automated fraud analysis of content view information on the online media distribution platform;

obtaining, by the campaign management computer system and from the online media distribution computer system, i) content view information for the user-generated media content on the online media distribution platform and ii) historical view information for other media content previously generated by the at least one content creating user and distributed online to content consuming users from the online media distribution system, the content view information identifying a number of views of the user-generated media content on content consuming computing devices resulting from distribution of the user-generated media content by the online media distribution computer system over the internet, wherein the other media content is not enrolled in the campaign, the historical view information for the at least one content creating user identifying an average number of views for the other media content online from the online media distribution system by content consuming users;

automatically performing, by the campaign management computer system, fraud analysis on the content view information, the fraud analysis (i) determining, using the historical view information, whether the number of views for the user-generated media content on the online media distribution computer system deviates, by an amount 25% or greater, from the average number of views for the other media content for the at least one content creating user and (ii) identifying that there is a likelihood of fraud for the number of views of the user-generated media content over the internet in response to determining that the number of views deviates by an amount 25% or greater from the average number of views for the other media content for the at least one content creating user;

providing, by the campaign management computer system and in response to identifying the likelihood of fraud, an alert indicating that at least a portion of the content view information is fraudulent;

determining, by the campaign management computer system and in response to the alert, an amount of compensation for the user-generated media content based on (i) the level of compensation per view, (ii) the content view information, and (iii) the fraud analysis; and providing, by the campaign management computer system, information that identifies the determined amount of compensation for the user-generated media content.

18. The computer-implemented method of claim 17, wherein the fraud analysis further comprises:

identifying, by the campaign management computer system and from the content view information, an overall number of views of the user-generated content over the internet;

identifying, by the campaign management computer system and from the content view information, a number unique viewers of the user-generated content, the unique viewers including one or more of: unique content consumers who viewed the user-generated content over the internet and unique content consuming computing devices on which the user-generated content was viewed;

determining, by the campaign management computer system, a ratio of the unique viewers of the user-generated content to the overall number of views of the user-generated content; and identifying, by the campaign management computer system, that at least a portion of the content view information is fraudulent based on the determined ratio being less than a threshold ratio of unique viewers to overall views of the user-generated content.

19. The computer-implemented method of claim 18, wherein determining the amount of compensation comprises:

adjusting, by the campaign management computer system in response to identifying that at least a portion of the content view information is fraudulent, the content view information so that the overall number of views of the user-generated content to be the number of unique viewers of the user-generated content, wherein the amount of compensation is determined based on (i) the level of compensation per view and (ii) the adjusted content view information.

20. The computer-implemented method of claim 17, wherein the fraud analysis further comprises:

obtaining, by the campaign management computer system, the historical view information for the other media content generated by the creators of the user-generated content, the historical view information including, at least, (i) historical rates of views of the other media content over time and (ii) historical engagement ratios of engagement to views for the other media content across one or more engagement metrics;

identifying, by the campaign management computer system and from the content view information, numbers of views of the user-generated content over the internet over one or more time periods;

determining, by the campaign management computer system, a current rate of views of the user-generated content based on the number of views over the one or more time periods;

identifying, by the campaign management computer system and from the content view information, one or more current levels of engagement over the internet with the user-generated content across the one or more engagement metrics, the one or more engagement metrics being selected from the group consisting of: likes, dislikes, comments, and shares of the user-generated content;

determining, by the campaign management computer system, current engagement ratios of engagement to views for the user-generated content based on (i) the number of views of the user-generated content and (ii) the one or more current levels of engagement; and identifying, by the campaign management computer system, that at least a portion of the content view information is fraudulent based on one or more of: (i) the current rate of views deviating from the historical rate of views by more than a threshold amount, and (ii) the current engagement ratios deviating from the historical engagement ratios by more than a threshold amount.

* * * * *

UNITED STATES PATENT AND TRADEMARK OFFICE
CERTIFICATE OF CORRECTION

PATENT NO. : 10,140,630 B2
APPLICATION NO. : 14/212703
DATED : November 27, 2018
INVENTOR(S) : George Stompolos et al.

Page 1 of 1

It is certified that error appears in the above-identified patent and that said Letters Patent is hereby corrected as shown below:

In the Claims

Column 29, Line 32, in Claim 1, delete "based the" and insert -- based on the --, therefor.

Column 33, Line 22, in Claim 16, delete "based the" and insert -- based on the --, therefor.

Signed and Sealed this
Nineteenth Day of November, 2019

Andrei Iancu
*Director of the United States Patent and Trademark Office*